United States Patent
Robb et al.

(10) Patent No.: US 11,750,553 B2
(45) Date of Patent: Sep. 5, 2023

(54) SUGGESTED DELAY DELIVERY OF ELECTRONIC MESSAGES

(71) Applicant: Microsoft Technology Licensing, LLC, Redmond, WA (US)

(72) Inventors: Leanna Holly Robb, Seattle, WA (US); Noelle Renee Beaujon, Seattle, WA (US); Nagendra Kalyan Nanduru, Redmond, WA (US); Wendy Guo, Edmonds, WA (US); Sandeep Seri, Bellevue, WA (US); Bichong Li, Suzhou (CN); Qi Zhang, Suzhou (CN); Jinkai Zhang, Suzhou (CN); Siqi Yang, Suzhou (CN); Tor Andrew Imsland, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/772,474

(22) PCT Filed: Nov. 1, 2019

(86) PCT No.: PCT/CN2019/114982
§ 371 (c)(1),
(2) Date: Apr. 27, 2022

(87) PCT Pub. No.: WO2021/081976
PCT Pub. Date: May 6, 2021

(65) Prior Publication Data
US 2022/0385615 A1 Dec. 1, 2022

(51) Int. Cl.
*H04L 51/226* (2022.01)
*H04L 51/222* (2022.01)

(52) U.S. Cl.
CPC .......... *H04L 51/226* (2022.05); *H04L 51/222* (2022.05)

(58) Field of Classification Search
CPC ... H04L 51/226; H04L 51/222; H04L 51/214; G06Q 10/107
See application file for complete search history.

(56) References Cited

U.S. PATENT DOCUMENTS

| 7,475,116 B2 | 1/2009 | Hay |
| 7,487,218 B2 | 2/2009 | Pous et al. |

(Continued)

FOREIGN PATENT DOCUMENTS

| CN | 109792403 A | 5/2019 |
| EP | 2627046 A1 | 8/2013 |

OTHER PUBLICATIONS

"Schedule a One-to-One Email from the CRM", Retrieved From: https://web.archive.org/web/20200808003025/https://knowledge.hubspot.com/email/schedule-a-one-to-one-email-from-the-crm, Jul. 15, 2020, 3 Pages.

(Continued)

*Primary Examiner* — Austin J Moreau

(57) ABSTRACT

In non-limiting examples of the present disclosure, systems, methods and devices for surfacing email suggestions are presented. A first user account associated with a composer of an email may be identified. Core working hour and a time zone associated with that first user account may be determined. One or more recipient user accounts included in the email may be identified. Core working hours and a time zone associated with the recipient user accounts may be identified. If more than a threshold number, percentage, and/or ratio of the recipient users is not currently in core working hours when the email is being drafted/sent, a suggestion may be surfaced in association with the email to send the email (Continued)

at a later time when more recipient users are in their core working hours.

20 Claims, 15 Drawing Sheets

(56) References Cited

U.S. PATENT DOCUMENTS

| | | | |
|---|---|---|---|
| 8,499,042 | B2 | 7/2013 | Brown et al. |
| 9,602,458 | B2 | 3/2017 | Deluca et al. |
| 9,767,462 | B2 * | 9/2017 | Byers .................. G06Q 10/107 |
| 10,313,277 | B2 | 6/2019 | Yates |
| 2007/0112920 | A1 | 5/2007 | Hay |
| 2011/0010430 | A1 | 1/2011 | Wang et al. |
| 2013/0275516 | A1 * | 10/2013 | Grant ..................... H04L 67/54 709/206 |
| 2018/0097752 | A1 * | 4/2018 | Yates .................... H04L 51/214 |
| 2018/0139292 | A1 | 5/2018 | Koren et al. |
| 2018/0351901 | A1 | 12/2018 | Snider et al. |

OTHER PUBLICATIONS

"Scheduling Messages to Send at Key Times", Retrieved From: https://web.archive.org/web/20200930093359/https://support.contactually.com/hc/en-us/articles/360006841132-Scheduling-messages-to-send-at-key-times, Sep. 30, 2020, 3 Pages.

"Use Send Time Optimization", Retrieved From: https://web.archive.org/web/20191015152143/https:/mailchimp.com/help/use-send-time-optimization/, Oct. 15, 2019, 4 Pages.

"Where's my Outbox in Outlook for Mac?", Retrieved From: https://support.microsoft.com/en-us/office/where-s-my-outbox-in-outlook-for-mac-5018fdd3-26b9-4fa0-b111-b656cdb5afae?ui=en-us&rs=en-us&ad=us, Mar. 1, 2018, 3 Pages.

"Write Now, Send Later with Schedule Send in Gmail", Retrieved From: https://workspaceupdates.googleblog.com/2019/04/write-now-send-later-with-schedule-send.html, Apr. 1, 2019, 5 Pages.

Carbone, Alisa, "Scheduling Tracked Messages to Send at a Specific Date and Time with Time Zone Sending", Retrieved From: https://web.archive.org/web/20200928054341/https://support.politemail.com/hc/en-us/articles/360026455634-Scheduling-Tracked-Messages-to-Send-at-a-Specific-Date-and-Time-with-Time-Zone-Sending, Jun. 22, 2020, 7 Pages.

Jenkins, Jack, "Schedule a Message to Send at the Right Time", Retrieved From: https://web.archive.org/web/20191022215315/https://www.intercom.com/help/en/articles/234-schedule-a-message-to-send-at-the-right-time, Oct. 22, 2019, 5 Pages.

"International Search Report and Written Opinion Issued in PCT Application No. PCT/CN19/114982", dated Jul. 10, 2020, 9 Pages.

"Extended European Search Report Issued in Application No. 19950624.7", dated Jun. 26, 2023, 12 Pages.

* cited by examiner

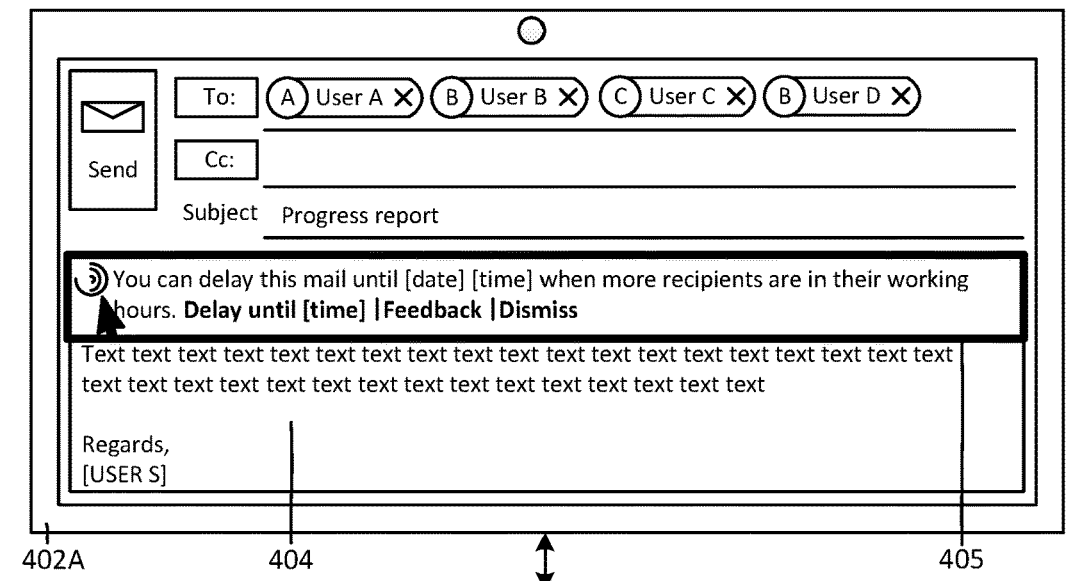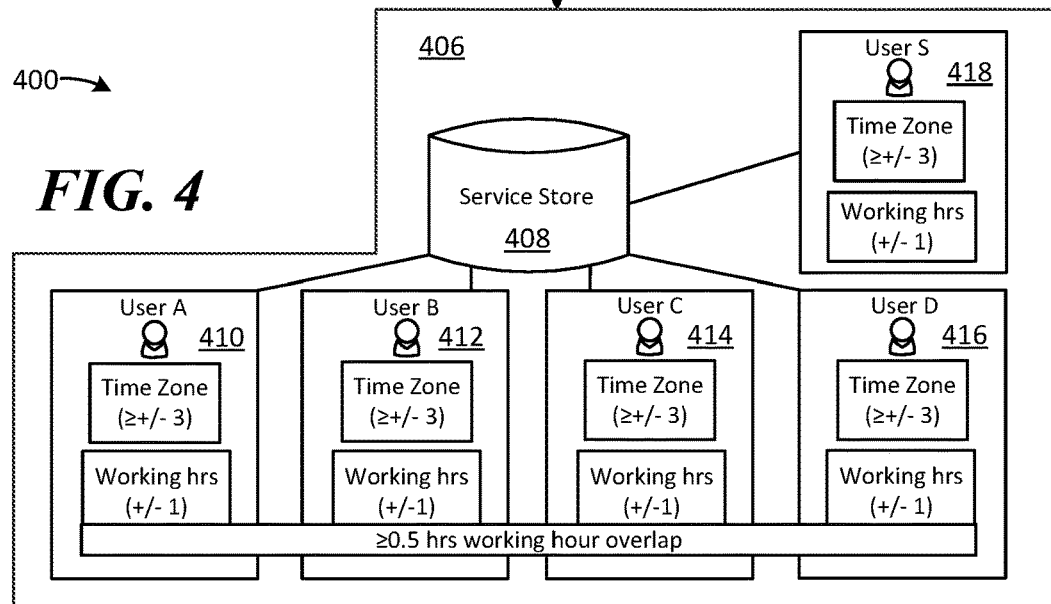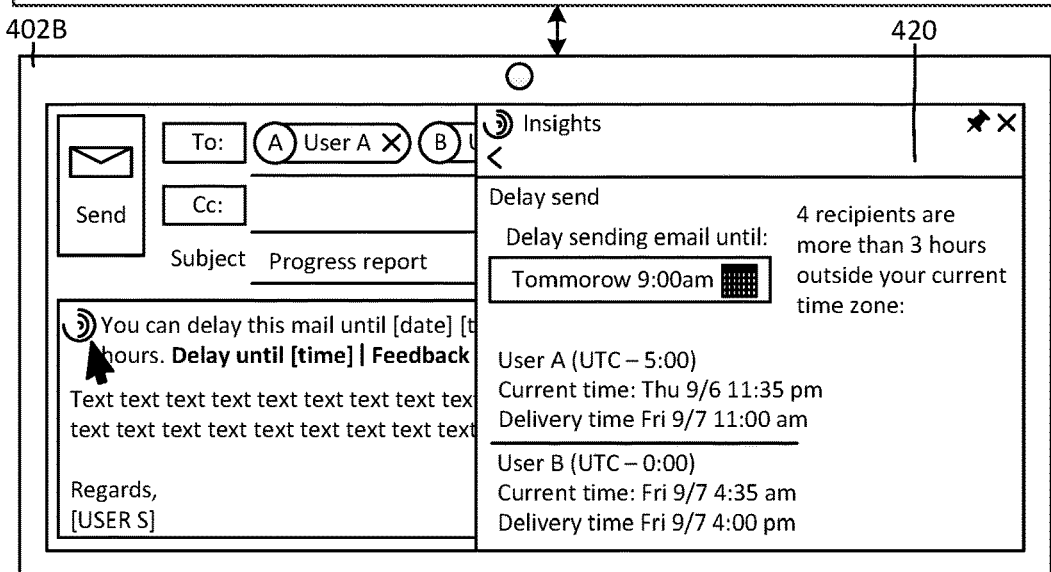
FIG. 4

SUGGESTED DELAY DELIVERY OF ELECTRONIC MESSAGES

CROSS-REFERENCE TO RELATED APPLICATIONS

This application is a national stage of International Application No. PCT/CN2019/114982 filed on Nov. 1, 2019; the entire contents of which is incorporated herein by reference in its entirety for all purposes.

BACKGROUND

It has become common for enterprises to make substantial investments in their employees' health and wellbeing. Enterprises understand that such investments are worthwhile because they are better able to retain talent. Additionally, the work product from healthy and happy employees is generally better. In an enterprise workplace, emails are a primary mode of communication, and a great deal of employee time is spent interacting with email clients. Email-related anxiety is a pressing problem that impacts employee productivity and health. The problem is heightened because of after-hour work emails that are sent and received. This problem is further heightened because of the increased need to work with others across the globe in different time zones.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for automatically delaying, or surfacing suggestions for delaying, the sending of emails until a higher number, ratio, and/or percentage of recipient users are in their core working hours. In examples, core working hours and a time zone for a sending user of an email may be identified/determined while the email is being drafted and/or when a send operation has been received for the email. Core working hours and time zones for recipient users may also be identified/determined. If a determination is made that a threshold number, ratio, and/or percentage of the recipient users are not in their core working hours while the email is being drafted and/or when a send operation has been received for the email, a suggestion may be surfaced on the email user interface of the sending user to delay the sending of the email until a time when more recipient users are in their core working hours. The suggested time for sending the email may be determined based on the respective time zones of the recipient users compared with the sending user.

BRIEF DESCRIPTION OF THE DRAWINGS

Non-limiting and non-exhaustive examples are described with reference to the following figures:

FIG. 4 illustrates a computing environment surfacing a suggestion to delay the sending of an email message based on remote recipients (outside of a time zone threshold from a sending user) being outside of their core working hours during the drafting of the email by the sending user outside of the sending user's core working hours.

DETAILED DESCRIPTION

Figure 1:
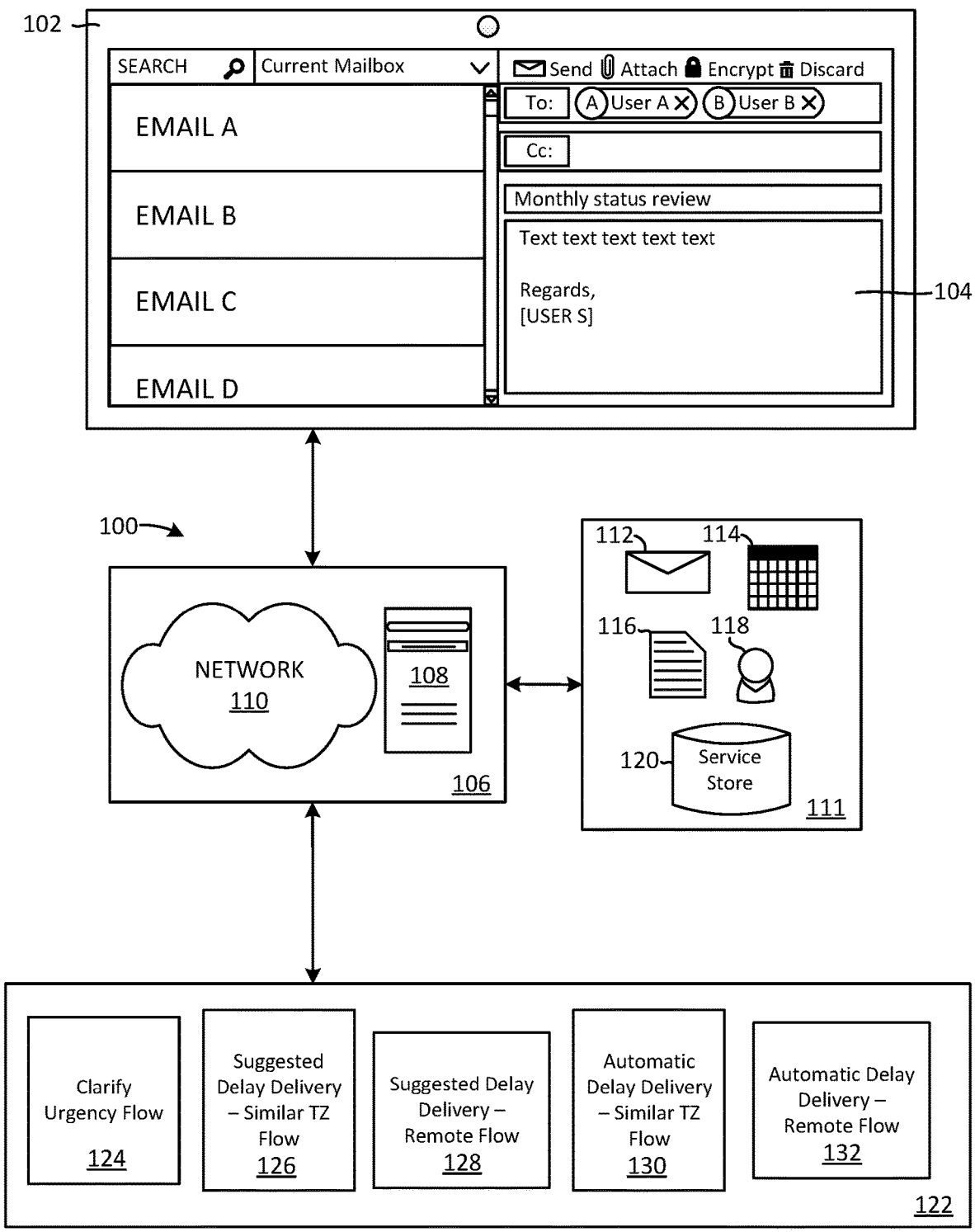
FIG. 1 is a schematic diagram illustrating an example distributed computing environment for surfacing email suggestions in relation to users that are working outside of core hours.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Non-limiting examples of the present disclosure describe systems, methods and devices for automatically delaying, or surfacing suggestions for delaying, the sending of emails until a higher number, ratio, and/or percentage of recipient users are in their core working hours. As used herein, "core hours" or "core work hours" may comprise hours/times during a day that a user is typically working. In some examples, core hours may be identified based on analyzing one or more signals associated with a user account for a user and one or more applications and/or services that are associated with that user account. Signals that may be analyzed include document metadata (e.g., indications that edits have been made to a document and associated timestamps), email traffic, email metadata, electronic calendar information (e.g., times blocked off, meeting information), to-do list application data, etc. In other examples, "core hours" or "core work hours" may comprise hours/times during a day that a user is expected to be working. Those hours may be associated with a user account (via settings) and/or one or more computing devices associated with a user account, by a manager and/or an administrator user account.

In a first example, a suggestion to clarify the urgency of an email may be surfaced based on a sending user composing an email outside of the sending user's core working hours, one or more recipient users being outside of their core working hours, and there being no overlap of the recipient users' core working hours.

In a second example, a suggestion to delay the delivery of an email may be surfaced based on a sending user being outside of the sending user's core working hours while drafting the email, one or more recipient users being outside of their core working hours, two or more recipient users having overlapping core working hours (if there is more than one recipient), and a threshold number, ratio, and/or percentage of recipient users being within a threshold number of time zones from the sending user.

In a third example, a suggestion to delay the delivery of an email may be surfaced based on a sending user being outside of the sending user's core working hours while drafting the email, one or more recipient users being outside of their core working hours, two or more recipient users having overlapping core working hours (if there is more than one recipient), and a threshold number, ratio, and/or percentage of recipient users being outside a threshold number of time zones from the sending user.

In a fourth example, a notification that an email will be automatically delayed may be surfaced based on a sending user drafting an email at any time, one or more recipient users being outside of their core working hours, two or more recipient users having overlapping core working hours (if there is more than one recipient), and a threshold number, ratio, and/or percentage or recipient users being within a threshold number of time zones from the sending user. In this fourth example, once a user has configured delay delivery to be automatic via one or more settings in an email application, any email that the user sends outside of her core working hours may be automatically delayed and a notification may be surfaced that indicates a time that the email will be delayed until.

In a fifth example, a notification that an email will be automatically delayed may be surfaced based on a sending user drafting an email at any time, one or more recipient users being outside of their core working hours, two or more recipient users having overlapping core working hours (if there is more than one recipient), and a threshold number, ratio, and/or percentage of recipient users being outside a threshold number of time zones from the sending user. In this fifth example, once a user has configured delay delivery to be automatic via one or more settings in an email application, any email that the user sends outside of her core working hours may be automatically delayed and a notification may be surfaced that indicates a time that the email will be delayed until.

The systems, methods, and devices described herein provide technical advantages for surfacing delayed messaging suggestions. Processing cots (i.e., CPU cycles) associated with sending users having to manually open electronic calendars and perform searches regarding time zone information for various recipient users are reduced via the automation of these operations and/or the ability to identify time zone and core working hours from user account settings. The cognitive load of knowing working hours and time zones when trying to send emails is also reduced on the sending user. Wellness of users is enhanced in that the mechanisms described herein reduce responses to email and the initiation of unintentional conversations during quiet hours, therefore helping users to reduce the number of hours spent working outside of core work time. Additionally, productivity is enhanced in that the mechanisms described herein provide suggestions for sending emails at times when those emails will catch recipients when they will be most receptive to sending users' content instead of when they are on their own time.

FIG. 1 is a schematic diagram illustrating an example distributed computing environment 100 for surfacing email suggestions in relation to users that are working outside of core work hours. Distributed computing environment 100 includes computing device 102, service store sub-environment 111, network and processing sub-environment 106, and suggestion sub-environment 122. Any and all of the computing devices described herein may communicate with one another via a network, such as network 110.

Computing device 102 displays an email application user interface that includes draft email 104. Draft email 104 is in currently being drafted by user S (email sending user). Draft email 104 includes user A and user B in the to/recipient field, and includes the subject "Monthly status review" in the subject field. In this example, user A, user B and user S are each part of a same organization (e.g., a company, a school, etc.). The joint membership in that organization may be associated with user accounts for each of those users. For example, the joint membership may be associated with each user account via a domain tied to a corresponding alias. In additional examples, the joint membership may be associated with each user via a computing tenancy. The users may provide access, to one or more other users, to their core work hours information, current time information, time zone information, location information, and/or other computing resource information that may be associated with their corresponding accounts.

Network and processing sub-environment 106 includes network 110 and server computing device 108. Server computing device 108 is representative of one or more server computing devices that may host an electronic message service and/or a delayed messaging service as described herein. Although the service primarily described herein is referred to as a "delayed messaging service", it should be understood that the delayed messaging service may be part of and/or incorporated in an email service.

User S may be associated with computing device 102 via a user account that is tied to an account in network and processing sub-environment 106, such as the delayed messaging service. In some examples, a same set of credentials may be utilized to sign into computing device 102 as are required to sign into the user account associated with the delayed messaging service. The delayed messaging service and/or computing device 102 may be associated, in the context of user S's login credentials, with one or more additional applications and/or services. For example, user S's credentials (and user account) may be associated with email applications and/or services, calendar applications and/or services, document creation applications and/or services, word processing applications and/or services, spreadsheet applications and/or services, presentation applications and/or services, etc. The applications and/or services that are associated with user S's login credentials and/or user S's account may be executed entirely on a local device such as computing device 102, partially on a local device such as computing device 102 and partially on one or more cloud-based devices such as server computing device 108, or entirely on cloud-based computing devices such as server computing device 108.

Service store sub-environment 111 comprises service store 120, which contains information associated with a plurality of users' electronic calendar/scheduling applications, including documents 116, user information 118, past, present, and future calendar events 114, and meeting/event invitations 112 associated with past, present and future events. Documents 116 may include productivity application documents that are stored locally to a local computing device such as computing device 102 and/or one or more remote storage locations. Documents 116 may comprise one or more documents of one or more document types, including one or more of: emails, saved instant messages, word processing documents, presentation documents, spreadsheet documents, note application documents, etc. Server computing device 108 and an associated delayed messaging service may communicate with service store 120 and obtain and analyze information included in service store 120 in performing one or more operations described herein.

According to examples, the delayed messaging service may perform operational flows associated with surfacing suggestions to delay the sending of email messages to recipients, and/or clarifying the urgency of draft emails prior to sending them. In determining which flow to perform and/or which suggestions to surface, the delayed messaging service may utilize core work hour information associated with user accounts, time zone information associated with, and/or relationship/connection information associated with user accounts. Additionally, in determining which flow to perform and/or which suggestions to surface, the delayed messaging service may analyze draft emails, such as draft email 104, including the recipient identities (e.g., user A, user B), the drafting user identity (e.g., user S), the content of a draft email, and/or attachments included and/or linked to in a draft email.

Exemplary operational flows that the delayed messaging service may execute are illustrated by way of suggestion sub-environment 122. Specifically, suggestion sub-environment 122 includes clarify urgency flow 124, suggested delay delivery—similar time zone flow 126, suggested delay delivery—remote flow 128, automatic delay delivery—similar time zone flow 130, and automatic delay delivery—remote flow 132. Additional details regarding those operational flows are provided below in relation to FIG. 2.

Figure 2:
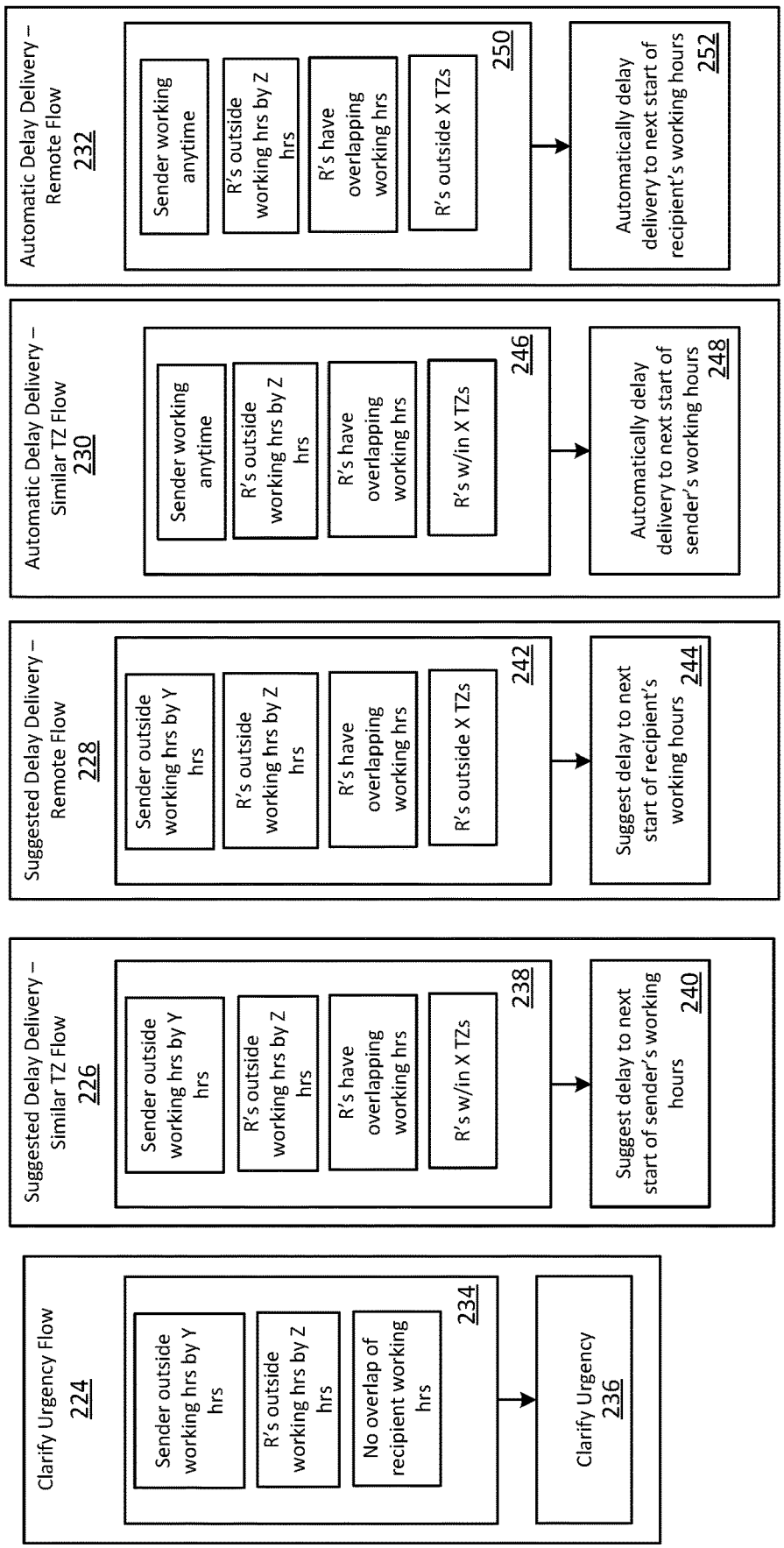
FIG. 2 illustrates exemplary flows for surfacing email suggestions in relation to users that are working outside of core hours.

FIG. 2 illustrates exemplary flows 200 for surfacing email suggestions in relation to users that are working outside of core hours. Flows 200 includes clarify urgency flow 224, suggested delay delivery—similar time zone flow 226, suggested delay delivery—remote flow 228, automatic delay delivery—similar time zone flow 230, and automatic delay delivery—remote flow 232. Operations associated with each of flows 200 may be performed by the delayed messaging service.

Clarify urgency flow 224 includes conditions 234 and clarify urgency result 236. For clarify urgency result 236 to be executed/displayed, each of conditions 234 must be determined to be true for a given draft email, an associated sending user (i.e., user account), and one or more associated recipients (i.e., recipient user accounts).

Conditions 234 include a first condition that the sending user of an email is drafting the email outside of the sending user's core working hours or that a send command has been received for the draft email outside of the sending user's core working hours. The first condition may be the sending user is drafting the email or has executed a send command for the email a threshold duration of time outside of the sending user's core working hours. The threshold duration of time may be before the sending user's core working hours begin for a given day or after the sending user's core working hours end for a given day. The threshold duration of time may be five minutes, thirty-minutes, one-hour, etc.

Conditions 234 include a second condition that each of (or a threshold number, percentage, or ratio of) the recipients included in the draft email are outside of their respective core work hours while the email is being drafted or after a send command has been received for the email. In some examples, the second condition may be that each of the recipients is a threshold duration of time outside of her core working hours while the email is being drafted or after a send command has been received for the email. In other examples, the second condition may be that a threshold number, percentage, or ratio of the recipients are a threshold duration of time outside of their core working hours while the email is being drafted or after a send command has been received for the email. The threshold duration of time may be before a recipient user's core working hours begin for a given day or after a recipient user's core working hours end for a given day. The threshold duration of time may be five minutes, thirty-minutes, one hour, etc.

Conditions 234 further include a third condition that each of (or a threshold number, percentage, or ratio of) the recipients included in the draft email do not have any core working hours that overlap with any other recipient included in the draft email.

Upon determining that each of conditions 234 is true, the delayed messaging service may cause a suggestion to be surfaced in association with the corresponding email that is being drafted (or that the sending user has executed a send command in relation to) on the sending user's email application user interface. The suggestion may provide a recommendation and/or selectable option to clarify the urgency, or lack thereof, of the draft email. If the draft email is deemed to be important enough, the sending user may nonetheless send the email with a heightened urgency notification associated with it so that the recipient users will more likely review/respond to the email despite being outside of their core working hours. In other examples, one or more natural language processing models may be applied to the email and a determination may be automatically made as to the email's urgency. The delayed messaging service may then present the drafting user with a selectable option to send the email with a heightened urgency notification associated with it so that the recipient users will more likely review/respond to the email despite being outside of their core working hours. If the draft email is deemed to not be as important, the sending user may be presented with a selectable option to send the email with a lowered urgency notification (or without an urgency notification) associated with it so that the recipient users will more likely not review/respond to the email until their core working hours resume. These options are illustrated by clarify urgency result 236.

Suggested delay delivery—similar time zone flow 226 includes conditions 238 and suggest delay result 240. For suggest delay result 240 to be executed/displayed, each of conditions 238 must be determined to be true for a given draft email, an associated sending user (i.e., user account), and one or more associated recipients (i.e., recipient user accounts).

Conditions 238 include a first condition that the sending user of an email is drafting the email outside of the sending user's core working hours or that a send command has been received for the draft email outside of the sending user's core working hours. The first condition may be the sending user is drafting the email or has executed a send command for the email a threshold duration of time outside of the sending user's core working hours. The threshold duration of time may be before the sending user's core working hours begin for a given day or after the sending user' core working hours end for a given day. The threshold duration of time may be five minutes, thirty-minutes, one-hour, etc.

Conditions 238 include a second condition that each of (or a threshold number, percentage, or ratio of) the recipients included in the draft email are outside of their respective core work hours while the email is being drafted or after a send command has been received for the email. In some examples, the second condition may be that each of the recipients is a threshold duration of time outside of her core working hours while the email is being drafted or after a send command has been received for the email. In other examples, the second condition may be that a threshold number, percentage, or ratio of the recipients are a threshold duration of time outside of their core working hours while the email is being drafted or after a send command has been received for the email. The threshold duration of time may be before a recipient user's core working hours begin for a given day or after a recipient user's core working hours end for a given day. The threshold duration of time may be five minutes, thirty-minutes, one hour, etc.

Conditions 238 further include a third condition that each of (or a threshold number, percentage, or ratio of) the recipients included in the draft email have core working hours that overlap with other recipients included in the draft email. In some examples, the condition may be that the recipients have a threshold duration of overlapping time that their core working hours overlap (e.g., five minutes, thirty-minutes, one-hour, etc.) with other recipients.

Conditions 238 also include a fourth condition that each of (or a threshold number, percentage, or ratio of) the recipients included in the draft email are within a time zone threshold of the sending user. The time zone threshold may be a single time zone, two time zones, three time zones, four time zones, or five time zones, for example (where each time zone represents a one-hour difference).

Upon determining that each of conditions 238 is true, the delayed messaging service may cause a suggestion to be surfaced in association with the corresponding email that is being drafted (or that the sending user has executed a send command in relation to) on the sending user's email application user interface. The suggestion may provide a recommendation and/or selectable option to delay the sending of the draft email as further described in relation to FIG. 3 and FIG. 8A below.

Suggested delay delivery—remote flow 228 includes conditions 242 and suggest delay result 244. For suggest delay result 244 to be executed/displayed, each of conditions 242 must be determined to be true for a given draft email, an associated sending user (i.e., user account), and one or more associated recipients (i.e., recipient user accounts).

Conditions 242 include a first condition that the sending user of an email is drafting the email outside of the sending user's core working hours or that a send command has been received for the draft email outside of the sending user's core working hours. The first condition may be the sending user is drafting the email or has executed a send command for the email a threshold duration of time outside of the sending user's core working hours. The threshold duration of time may be before the sending user's core working hours begin for a given day or after the sending user's core working hours end of a given day. The threshold duration of time may be five minutes, thirty minutes, one-hour, etc.

Conditions 242 include a second condition that each of (or a threshold number, percentage, or ratio of) the recipients included in the draft email are outside of their respective core work hours while the email is being drafted or after a send command has been received for the email. In some examples, the second condition may be that each of the recipients is a threshold duration of time outside of her core working hours while the email is being drafted or after a send command has been received for the email. In other examples, the second condition may be that a threshold number, percentage, or ratio of the recipients are a threshold duration of time outside of their core working hours while the email is being drafted or after a send command has been received for the email. The threshold duration of time may be before a recipient user's core working hours begin for a given day or after a recipient user's core working hours end for a given day. The threshold duration of time may be five minutes, thirty-minutes, one hour, etc.

Conditions 242 further include a third condition that each of (or a threshold number, percentage, or ratio of) the recipients included in the draft email have core working hours that overlap with other recipients included in the draft email. In some examples, the condition may be that the recipients have a threshold duration of overlapping time that their core working hours overlap (e.g., five minutes, thirty-minutes, one-hour, etc.) with other recipients.

Conditions 242 further include a fourth condition that each of (or a threshold number, percentage, or ratio of) the recipients included in the draft email are outside a time zone threshold of the sending user. The time zone threshold may be a single time zone, two time zones, three time zones, four time zones, or five time zones, for example (where each time zone represents a one-hour difference)

Upon determining that each of conditions 242 is true, the delayed messaging service may cause a suggestion to be surfaced in association with the corresponding email that is being drafted (or that the sending user has executed a send command in relation to) on the sending user's email application user interface. The suggestion may provide a recommendation and/or selectable option to delay the sending of the draft email as further described in relation to FIG. 4 and FIG. 8B below.

Automatic delay delivery—similar time zone flow 230 includes conditions 246 and suggest delay result 248. For suggest delay result 248 to be executed/displayed, each of conditions 246 must be determined to be true for a given draft email, an associated sending user (i.e., user account), and one or more associated recipients (i.e., recipient user accounts).

Conditions 246 include a first condition that the sending user of an email is drafting the email or that a send command for the email has been received. That is, unlike conditions 242 where the email must be being drafted outside the sending user's core working hours, conditions 246 simply require that the sending user is drafting the email at any time.

Conditions 246 include a second condition that each of (or a threshold number, percentage, or ratio of) the recipients included in the draft email are outside of their respective core work hours while the email is being drafted or after a send command has been received for the email. In some examples, the second condition may be that each of the recipients is a threshold duration of time outside of her core working hours while the email is being drafted or after a send command has been received for the email. In other examples, the second condition may be that a threshold number, percentage, or ratio of the recipients are a threshold duration of time outside of their core working hours while the email is being drafted or after a send command has been received for the email. The threshold duration of time may before a recipient user's core working hours begin for a given day or after a recipient user's core working hours end for a given day. The threshold duration of time may be five minutes, thirty-minutes, one hour, etc.

Conditions 246 further include a third condition that each of (or a threshold number, percentage, or ratio of) the recipients included in the draft email have core working hours that overlap with other recipients included in the draft email. In some examples, the condition may be that the recipients have a threshold duration of overlapping time that their core working hours overlap (e.g., five minutes, thirty minutes, one-hour, etc.) with other recipients.

Conditions 246 further include a fourth condition that each of (or a threshold number, percentage, or ratio of) the recipients included in the draft email are within a time zone threshold of the sending user. The time zone threshold may be a single time zone, two time zones, three time zones, four time zones, or five time zones, for example (where each time zone represents a one-hour difference).

Figure 5:
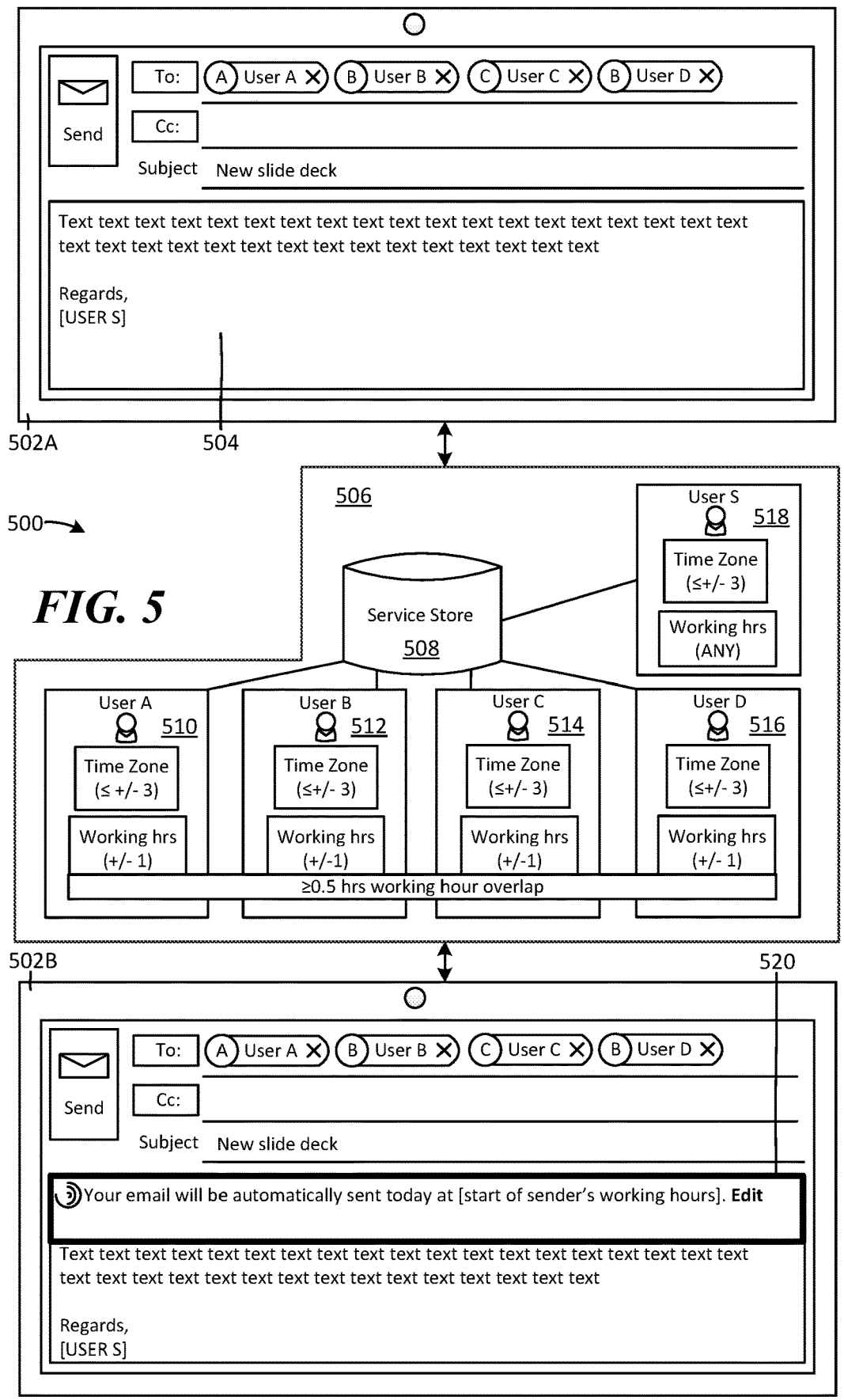
FIG. 5 illustrates a computing environment for automatically delaying the sending of an email message based on local recipients (inside of a time zone threshold from a sending user) being outside of their core working hours during the drafting of the email by the sending user at any time irrespective of the sending user's core working hours.

Upon determining that each of conditions 246 is true, the delayed messaging service may automatically delay the sending of the email until the start of the sender's working hours as further discussed in relation to FIG. 5. The delayed messaging service may also surface an indication of a time that the email will be delayed until.

Automatic delay delivery—remote flow 232 includes conditions 250 and suggest delay result 252. For suggest delay result 252 to be executed/displayed, each of conditions 250 must be determined to be true for a give draft email, an associated sending user (i.e., user account), and one or more associated recipients (i.e., recipient user accounts).

Conditions 250 include a first condition that the sending user of an email is drafting the email or that a send command for the email has been received. Thus, unlike conditions 242 where the email must be being drafted outside the sending user' core working hours, conditions 250 simply require that the sending user is drafting the email at any time.

Conditions 250 include a second condition that each of (or a threshold number, percentage, or ratio of) the recipients included in the draft email are outside of their respective core work hours while the email is being drafted or after a send command has been received for the email. In some examples, the second condition may be that each of the recipients is a threshold duration of time outside of her core working hours while the email is being drafted or after a send command has been received for the email. In other examples, the second condition may be that a threshold number, percentage, or ratio of the recipients are a threshold duration of time outside of their core working hours while the email is being drafted or after a send command has been received for the email. The threshold duration of time may before a recipient user's core working hours begin for a given day or after a recipient user's core working hours end for a given day. The threshold duration of time may be five minutes, thirty-minutes, one hour, etc.

Conditions 250 further include a third condition that each of (or a threshold number, percentage, or ratio of) the recipients included in the draft email have core working hours that overlap with other recipients included in the draft email. In some examples, the condition may be that the recipients have a threshold duration of overlapping time that their core working hours overlap (e.g., five minutes, thirty minutes, one-hour, etc.) with other recipients.

Conditions 250 further include a fourth condition that each of (or a threshold number, percentage, or ratio of) the recipients included in the draft email are outside of a time zone threshold of the sending user. The time zone threshold may be a single time zone, two time zones, three time zones, four time zones, or five time zones, for example (where each time zone represents a one-hour difference).

Figure 6:
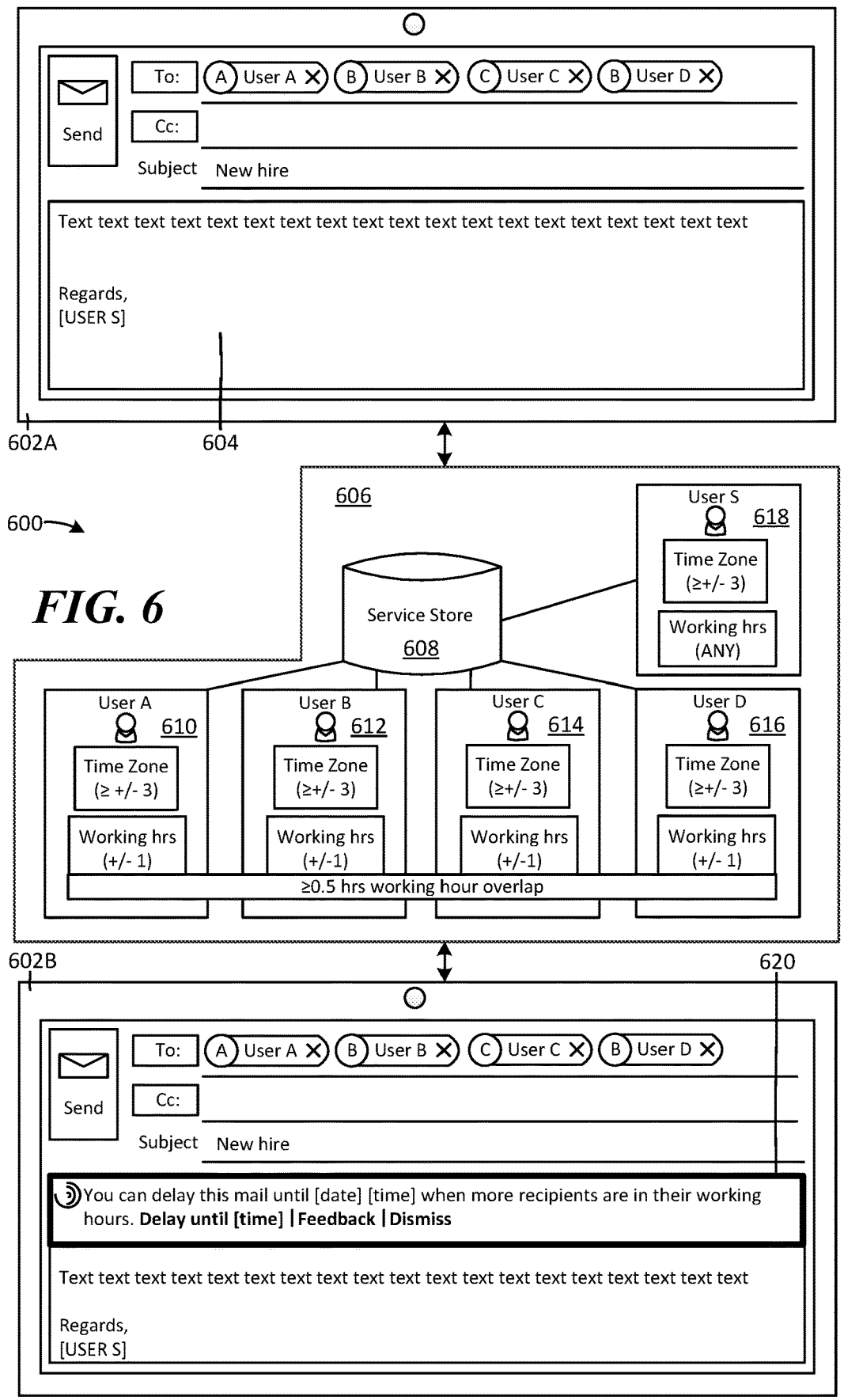
FIG. 6 illustrates a computing environment for automatically delaying the sending of an email message based on remote recipients (outside of a time zone threshold from the sending user) being outside of their core working hours during the drafting of the email by the sending user at any time irrespective of the sending user's core working hours.

Upon determining that each of conditions 250 is true, the delayed messaging service may automatically delay the sending of the email until the start of one or more recipients' core work hours as further discussed in relation to FIG. 6. The delayed messaging service may also surface an indication of a time that the email will be delayed until.

Figure 3:
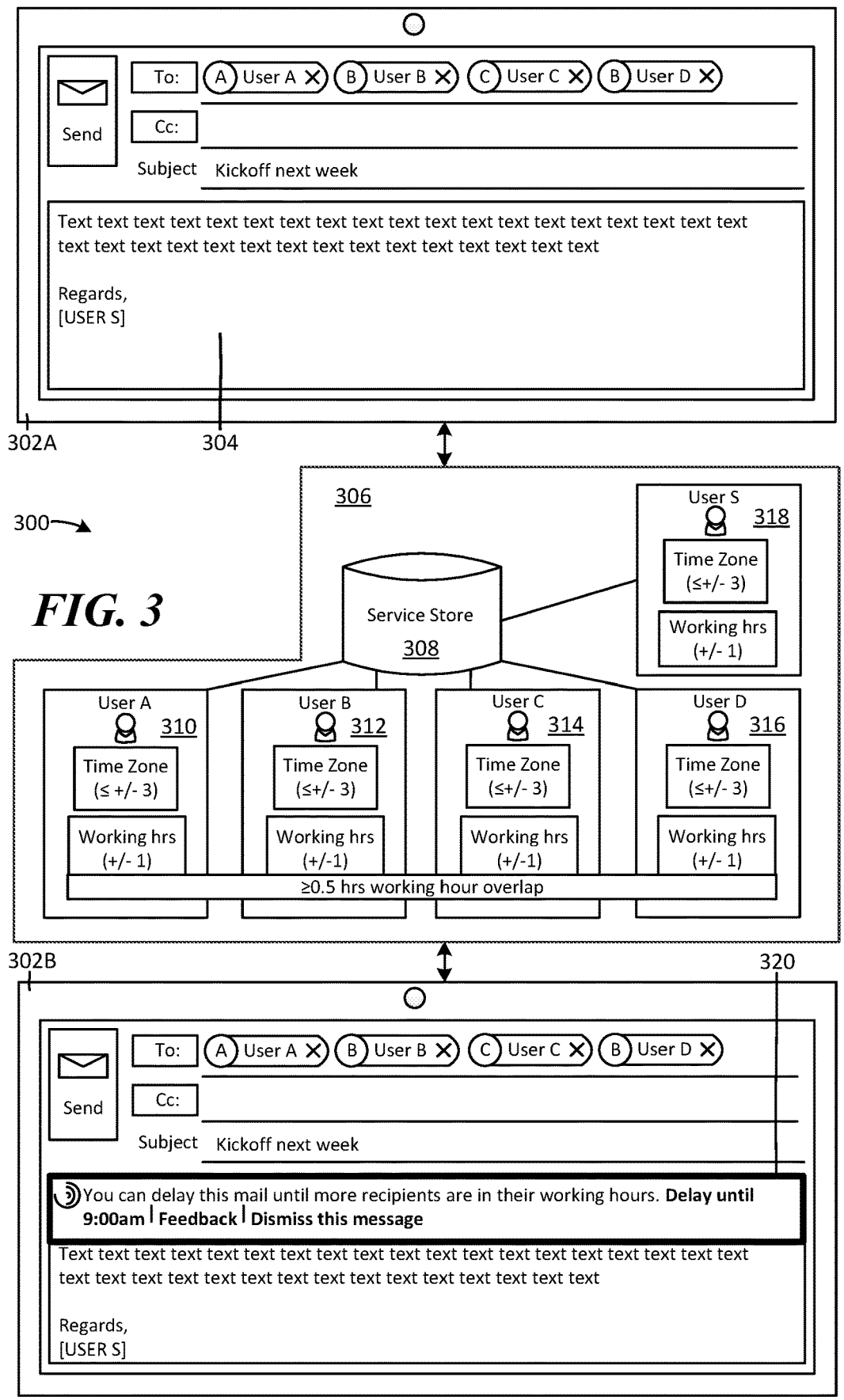
FIG. 3 illustrates a computing environment for surfacing a suggestion to delay the sending of an email message based on local recipients (inside of a time zone threshold from a sending user) being outside of their core working hours during the drafting of the email by the sending user outside of the sending user's core working hours.

FIG. 3 illustrates a computing environment 300 for surfacing a suggestion to delay the sending of an email message based on local recipients (inside of a time zone threshold from a sending user) being outside of their core working hours during the drafting of the email by the sending user outside of the sending user's core working hours. Computing environment 300 includes sending user computing device 302A and sending user computing device 302B, which are the same computing device, and service store sub-environment 306.

Computing device 302A displays an email application user interface. The email application user interface currently displays draft email 304, which a sending user (user S 318) is drafting to recipient users (user A 310, user B 312, user C 314, and user D 316). Service store 308 may include user account information associated with each of the recipient users and the sending user. Examples of information that service store 308 may contain for those users/user accounts include: user account alias information, usernames, passwords, core working hours information, time zone information, contacts information, calendar information, user connections and organization hierarchy information, etc.

In this example, the delayed messaging service may identify core working hours and time zone information associated with each of user S 318, user A 310, user B 312, user C 314, and user D 316. The indication to identify that information may comprise the drafting of draft email 304 and/or a send command to send draft email 304. The information may be identified from service store 308.

The delayed messaging service identifies the core working hours for user S 318 and determines that the time when draft email 304 is being composed is more than a threshold duration of time outside of the core working hours for user S 318. In this example, the threshold duration of time is one hour. However, the threshold duration of time may be shorter or longer. Additionally, the delayed messaging service identifies the time zones that each of the sending user and recipient users are in and determines that there is less than or equal to a threshold number of time zones that separate each recipient user and the sending user. In this example, the threshold number of time zones is three (i.e., plus or minus three hours). However, the threshold number of time zones may be less or more. Further, the delayed messaging service determines that the recipient users' core working hours overlap with one another for at least a threshold duration of time. In this example, the threshold is 0.5 hours. However, the threshold duration of time may be shorter or longer.

Based on the determinations made by the delayed messaging service, the delayed messaging service causes a suggestion to delay the sending of draft email 304 to be surfaced on computing device 302B in association with draft email 304. Specifically, the delayed messaging service causes a suggestion to delay the sending of draft email 304 until the start of the sending user's (user S 318) core working hours begin the next business day. Thus, in this example, suggestion 320 is surfaced, which states: "You can delay this mail until more recipients are in their working hours. Delay until 9:00 am". The "delay until 9:00 am" element may be selected for automatically delaying the sending of draft email 304 until that designated time. There are also selectable elements for providing feedback to the delayed messaging service regarding suggestion 320, as well as for dismissing suggestion 320. The feedback received via those selectable elements may be utilized by the delayed messaging service to finetune the delay suggestions that are provided to the sending user in the future. In some examples, one or more machine learning models that are applied by the delayed messaging service to determine when to surface delayed send suggestions and/or which types of delayed send suggestions to surface in relation to various email context information (e.g., core working hours, recipient users, time zone information, email content, etc.) may be trained utilizing the feedback received via the selectable elements included in suggestion 320.

FIG. 4 illustrates a computing environment 400 surfacing a suggestion to delay the sending of an email message based on remote recipients (outside of a time zone threshold from a sending user) being outside of their core working hours during the drafting of the email by the sending user outside of the sending user's core working hours. Computing environment 400 includes sending user computing device 402A and sending user computing device 402B, which are the same computing device, and service store sub-environment 406.

Computing device 402A displays an email application user interface. The email application user interface currently displays draft email 404, which a sending user (user S 418) is drafting to recipient users (user A 410, user B 412, user C 414, and user D 416). Service store 408 may include user account information associated with each of the recipient users and the sending user. Examples of information that service store 408 may contain for those users/user accounts include: user account alias information, usernames, passwords, core working hours information, time zone information, contacts information, calendar information, user connections and organization hierarchy information, etc.

In this example, the delayed messaging service may identify core working hours and time zone information associated with each of user S 418, user A 410, user B 412, user C 414, and user D 416. The indication to identify that information may comprise the drafting of draft email 404 and/or a send command to send draft email 404. The information may be identified from service store 408.

The delayed messaging service identifies the core working hours for user S 418 and determines that the time when draft email 404 is being composed is more than a threshold duration of time outside of the core working hours for user S 418. In this example, the threshold duration of time is one hours. However, the threshold duration of time may be shorter or longer. Additionally, the delayed messaging service identified the time zones that each of the sending user and the recipient users are in and determines that there is greater than or equal to a threshold number of time zones that separate each recipient user and the sending user. In this example, the threshold number of time zones is three (i.e., plus or minus three hours). However, the threshold number of time zones may be less or more. Further, the delayed messaging service determines that the recipient users' core working hours overlap with one another for at least a threshold duration of time. In this example, the threshold is 0.5 hours. However, the threshold duration of time may be shorter or longer.

Based on the determinations made by the delayed messaging service, the delayed messaging service causes a suggestion to delay the sending of draft email 404 to be surfaced on computing device 402A in association with draft email 404. Specifically, the delayed messaging service causes a suggestion to delay the sending of draft email 404 until at least a threshold number, percentage, or ratio of the recipient users are in their core working hours. In this example, the threshold number, percentage, or ratio is all four recipients, 4/4, and/or 100%. However, in some examples, the threshold may be lower. Thus, in this example, suggestion 405 is surfaced, which states: "You can delay this mail until [date] [time] when more recipients are in their working hours. Delay until [time]". There are also selectable options for providing feedback and for dismissing the suggestion.

Suggestion 405 is surfaced in association with a selectable insights element, which the cursor is hovered over on computing device 402A. In this example, a selection of the insights element has been made, which causes pop-up insight window 420 to be displayed in association with the draft email Specifically, insight window 420 includes an explanation that four of the recipients of the draft email are more than three hours outside of the sending user's current time zone. Additionally, there is a calendar/time box that allows the sending user to select a specific delayed sending time for the draft email. Further, insight window 420 also shows the current time for each of the recipient users that are three hours or more (the threshold number of time zones) outside of the sending user's time zone, as well as a time that the draft email will be sent/delivered to those users based on the selected delay time/date from the calendar/time box. In this example, only those time for user A 410 and user B 412 are displayed. However, the times for user C 414 and user D 416 may be scrolled down to in insight window 420.

FIG. 5 illustrates a computing environment 500 for automatically delaying the sending of an email message based on local recipients (inside of a time zone threshold from a sending user) being outside of their core working hours during the drafting of the email by the sending user at any time irrespective of the sending user's core working hours. Computing environment 500 includes sending user computing device 502A and sending user computing device 502B, which are the same computing device, and service store sub-environment 506.

Computing device 502A displays an email application user interface. The email application user interface currently displays draft email 504, which a sending user (user S 518) is drafting to recipient users (user A 510, user B 512, user C 514, and user D 516). Service store 508 may include user account information associated with each of the recipient users and the sending user. Examples of the information that service store 508 may contain for those users/user accounts include: user account alias information, usernames, passwords, core working hours information, time zone information, contacts information, calendar information, user connections and organization hierarchy information, etc.

In this example, the delayed messaging service may identify core working hours and time zone information associated with each of user S 518, user A 510, user B 512, user C 514, and user D 516. The indication to identify that information may comprise the drafting of draft email 504 and/or a send command to send draft email 504. The information may be identified from service store 508.

The delayed messaging service determines that the sending user is drafting draft email 504 at any time (e.g., it does not matter whether user S 518 is drafting the email during her core working hours or outside of her core working hours). Additionally, the delayed messaging service identifies the time zones that each of the sending user and recipient users are in and determines that there is less than or equal to a threshold number of time zones that separate each recipient user and the sending user. In this example, the threshold number of time zones is three (i.e., plus or minus three hours). However, the threshold number of time zones may be less or more. Further, the delayed messaging service determines that the recipient users' core working hours overlap with one another for at least a threshold duration of time. In this example, the threshold is 0.5 hours. However, the threshold duration of time may be shorter or longer.

Based on the determinations made by the delayed messaging service, the delayed messaging service automatically delays the sending of draft email 504. Specifically, the delayed messaging service causes automatically delays the sending of draft email 504 until the start of the sending user's (user S 518) core working hours begin the next business day. Thus, in this example, notification 520 is surfaced, which states: "Your email will be automatically sent today at [start of sender's working hours]. There is also a selectable "Edit" element in notification 520 that may be interacted with for changing the day and/or time that the email will be delayed until. In some examples, one or more machine learning models that are applied by the delayed messaging service to determine when to delay the sending of emails and/or which types of delayed send notifications to surface in relation to various email context information (e.g., core working hours, recipient users, time zone information, email content, etc.) may be trained utilizing the feedback received via the "Edit" element in notification 520.

FIG. 6 illustrates a computing environment 600 for automatically delaying the sending of an email message based on remote recipients (outside of a time zone threshold from the sending user) being outside of their core working hours during the drafting of the email by the sending user at any time irrespective of the sending user's core working hours. Computing environment 600 includes sending user computing device 602A and sending user computing device 602B, which are the same computing device, and service store sub-environment 606.

Computing device 602A displays an email application user interface. The email application user interface currently displays draft email 604, which a sending user (user S 618) is drafting to recipient users (user A 610, user B 612, user C 614, and user D 616). Service store 608 may include user account information associated with each of the recipient users and the sending user. Examples of the information that service store 608 may contain for those users/user accounts include: user account alias information, usernames, passwords, core working hours information, time zone information, contacts information, calendar information, user connections and organization hierarchy information, etc.

In this example, the delayed messaging service may identify core working hours and time zone information associated with each of user S 618, user A 610, user B 612, user C 614, and user D 616. The indication to identify that information may comprise the drafting of draft email 604 and/or a send command to send draft email 604. The information may be identified from service store 608.

The delayed messaging service determines that the sending user is drafting draft email 604 at any time (e.g., it does not matter whether user S 618 is drafting the email during her core working hours or outside of her core working hours). Additionally, the delayed messaging service identifies the tie zones that each of the sending user and recipient users are in and determines that there is more than or equal to a threshold number of time zones that separate each recipient user and the sending user. In this example, the threshold number of time zones is three (i.e., plus or minus three hours). However, the threshold number of time zones may be less or more. Further, delayed messaging service determines that the recipient users' core working hours overlap with one another for at least a threshold duration of time. In this example, the threshold is 0.5 hours. However, the threshold duration of time may be shorter or longer.

Based on the determinations made by the delayed messaging service, the delayed messaging service automatically delays the sending of draft email 604. Specifically, the delayed messaging service delays the sending of draft email 604 until at least a threshold number, ratio, or percentage of the recipient users are concurrently in their core working hours. Thus, in this example, notification 620 is surfaced, which states: "You can delay this mail until [date] [time] when more recipients are in their working hours. Delay until [time]". There are also selectable options for providing feedback and dismissing the notification. In some examples, one or more machine learning models that are applied by the delayed messaging service to determine when to automatically delay the sending of emails and surface notifications like notification 620 and/or which types of delayed send notifications to surface in relation to various email context information (e.g., core working hours, recipient users, time zone information, email content, etc.) may be trained utilizing the feedback received via the "Edit" element in notification 620.

Figure 7:
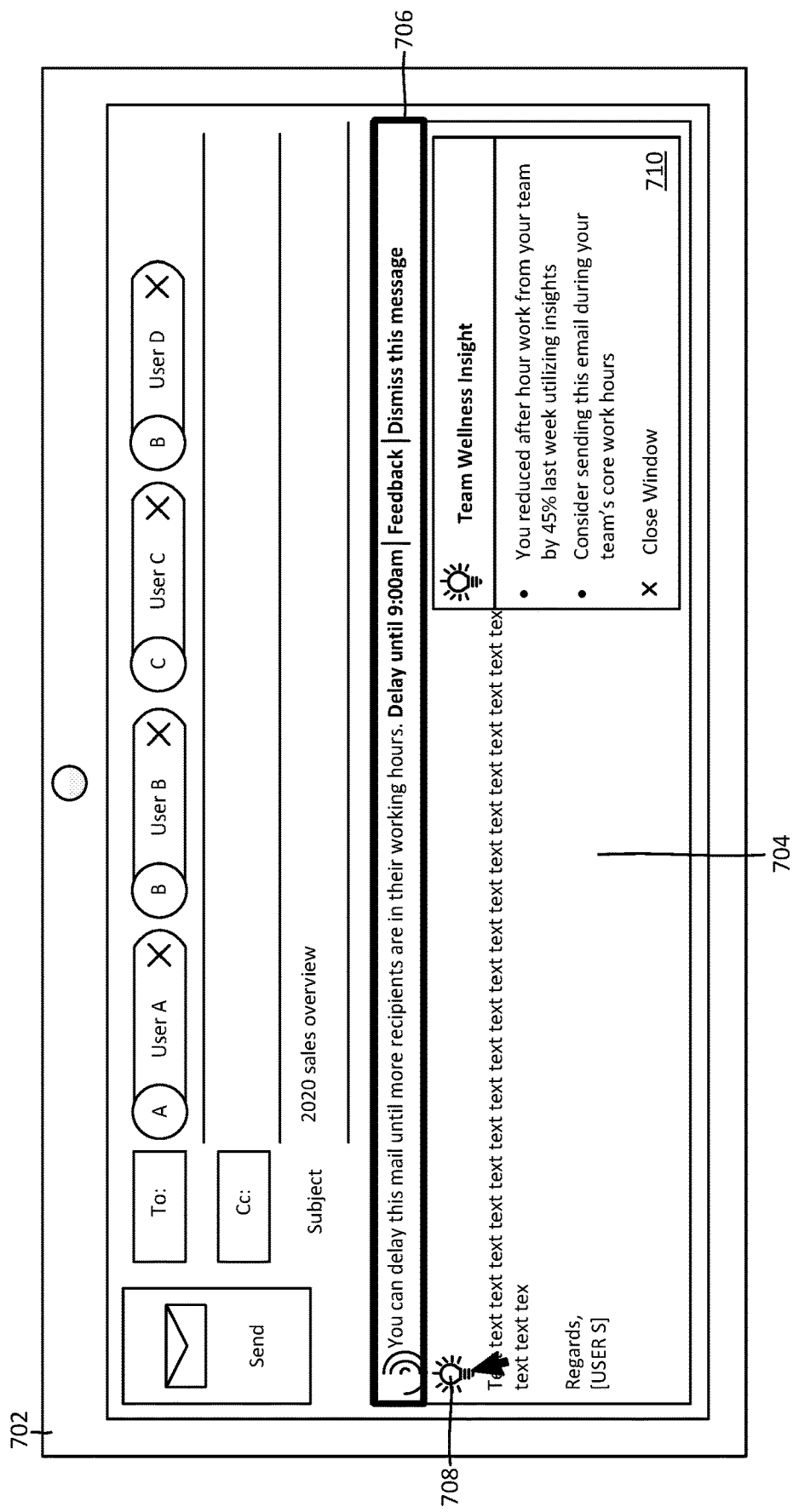
FIG. 7 illustrates an insight that may be surfaced in relation to a suggestion to delay the sending of an email.

FIG. 7 illustrates an insight that may be surfaced in relation to a suggestion to delay the sending of an email. FIG. 7 includes computing device 702, which displays an email application user interface. The email application user interface displays draft email 704, which is composed by a sending user (user S) and includes recipient users (user A, user B, user C, and user D) in the "to" field. In this example, the delayed messaging service has made a determination that a threshold number, ratio, and/or percentage of the recipient users are not currently in their core working hours. As such, the delayed messaging service causes suggestion 706 to be displayed in association with draft email 704. Suggestion 706 states: "You can delay this message until more recipients are in their core working hours. Delay until 9:00 am". There are also selectable elements for providing feedback to the delayed messaging service and/or dismissing suggestion 706.

The delayed messaging service also causes insight element 708 to be surfaced in association with draft email 704. In this example, a user interacts with insight element 708 (e.g., via a mouse hover, via a mouse click, via a voice input, via a touch input), and pop-up insight window 710 is subsequently surfaced. Pop-up insight window 710 provides feedback to the sending user regarding previously delayed email messages that have been delayed via the delayed messaging service. Specifically, insight window 710 states: "You reduced after hour work from your team by 45% last week utilizing insights—Consider sending this email during your team's core work hours". Thus, the delayed messaging service may analyze past use of the delayed email suggestions as well as the times and duration of time that recipient users spend reviewing work emails, to provide insights relating to why it is important for sending users to potentially delay sending emails to recipient users outside of their core working hours.

Figure 8A:
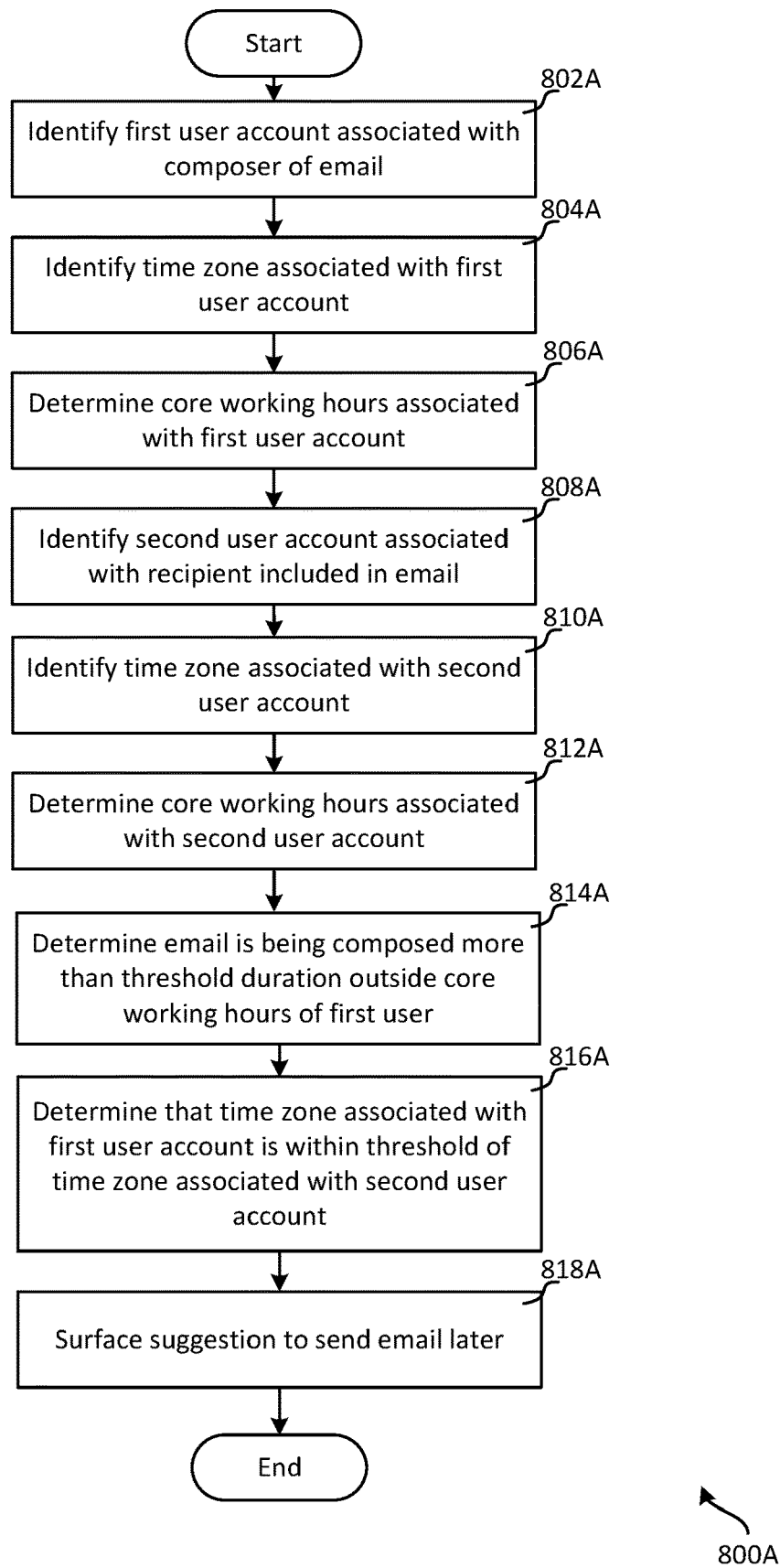
FIG. 8A is an exemplary method for surfacing suggestions for later delivery of email messages in relation to a drafter that is within a threshold number of time zones of recipients.

FIG. 8A is an exemplary method 800A for surfacing suggestions for later delivery of email messages in relation to a drafter that is within a threshold number of time zones of recipients. The method 800A begins at a start operation and flow moves to operation 802A.

At operation 802A a first user account is identified, the first user account being associated with a composer of an email. The user account may be associated with a computing device that the email is being drafted on and/or a cloud-based account that provides access to one or more cloud-based applications and/or services. In some examples, the user account may be associated with a delayed messaging service. The email may be drafted on an email application that installed locally on the composer's computing device or on an email application that is hosted in the cloud.

From operation 802A flow continues to operation 804A where a time zone associated with the first user account is identified. The time zone may be identified based on settings associated with the user account or a computing device associated with the user account; based on time, date, and/or clock settings associated with the user account or a computing device associated with the user account; and/or based on information obtained from one or more other computing devices associated with the user account (e.g., time/date information from a smart phone associated with the user account, time/date information from a tablet device associated with the user account, etc.).

From operation 804A flow continues to operation 806A where core working hours associated with the first user account are determined. The core working hours may be based on work settings associated with user account. For example, one or more computing devices associated with the user account may include core working hours for the associated user. In additional examples, the core working hours may be automatically determined based on one or more signals. In some examples, the core working hours may be determined based on location data associated with the user account (e.g., smart phone associated with user account travels to and/or from work at X and Y times). In additional examples, the core working hours may be determined based on analyzing timestamp and use data from one or more productivity applications associated with the user account (e.g., email applications, word processing applications, spreadsheet applications, productivity applications). In still additional examples, the core working hours may be determined based on analyzing calendar data associated with the user account. Any combination of the same may be utilized in determining the core working hours for a user/user account.

From operation 806A flow continues to operation 808A where a second user account is identified, the second user account being associated with a recipient included in the email. In examples, the second user account may be identified by the delayed messaging service associated with the first user and/or the second user. In some examples, a user must have to affirmatively opt in (e.g., via selection of privacy settings) for the delayed messaging service to have access to the user's account information (e.g., core working hours, time zone information, productivity application information, contacts information, etc.).

From operation 808A flow continues to operation 810A where a time zone associated with the second user account is identified. The time zone may be identified based on settings associated with the user account or a computing device associated with the user account; based on time, date, and/or clock settings associated with the user account or a computing device associated with the user account; and/or based on information obtained from one or more other computing devices associated with the user account (e.g., time/date information from a smart phone associated with the user account, time/date information from a tablet device associated with the user account, etc.).

From operation 810A flow continues to operation 812A where core working hours associated with the second user account are determined. The core working hours may be based on work settings associated with user account. For example, one or more computing devices associated with the user account may include core working hours for the associated user. In additional examples, the core working hours may be automatically determined based on one or more signals. In some examples, the core working hours may be determined based on location data associated with the user account (e.g., smart phone associated with user account travels to and/or from work at X and Y times). In additional examples, the core working hours may be determined based on analyzing timestamp and use data from one or more productivity applications associated with the user account (e.g., email applications, word processing applications, spreadsheet applications, productivity applications). In still additional examples, the core working hours may be determined based on analyzing calendar data associated with the user account. Any combination of the same may be utilized in determining the core working hours for a user/user account.

From operation 812A flow continues to operation 814A where a determination is made that the email is being composed more than a threshold duration of time outside of the core working hours associated with the first user account. For example, the email may be being drafted a threshold duration of time prior to the first user's core working hours beginning for a day or a threshold duration of time after the first user's core working hours have ended for a day. The threshold duration may be determined based on a time that the email is being drafted utilizing timestamp and editing information from the email application (e.g., a time when one or more characters have been typed in an email, a time when one or more recipients are added to an email, etc.), and/or based on a time that a "send" command is received for the email. The threshold duration of time may be one millisecond, five minutes, an hour, two hours, and/or three hours, for example.

From operation 814A flow continues to operation 816A where a determination is made that the time zone associated with the first user account is within a threshold temporal period of the time zone associated with the second user account. In some examples, the threshold temporal period may be a single time zone, two time zones, three time zones, or four time zones, for example.

From operation 816A flow continues to operation 818A where a suggestion to send the email at a time when the core working hours associated with the first and second user accounts overlap is surfaced.

From operation 818A flow moves to an end operation and the method 800A ends.

Figure 8B:
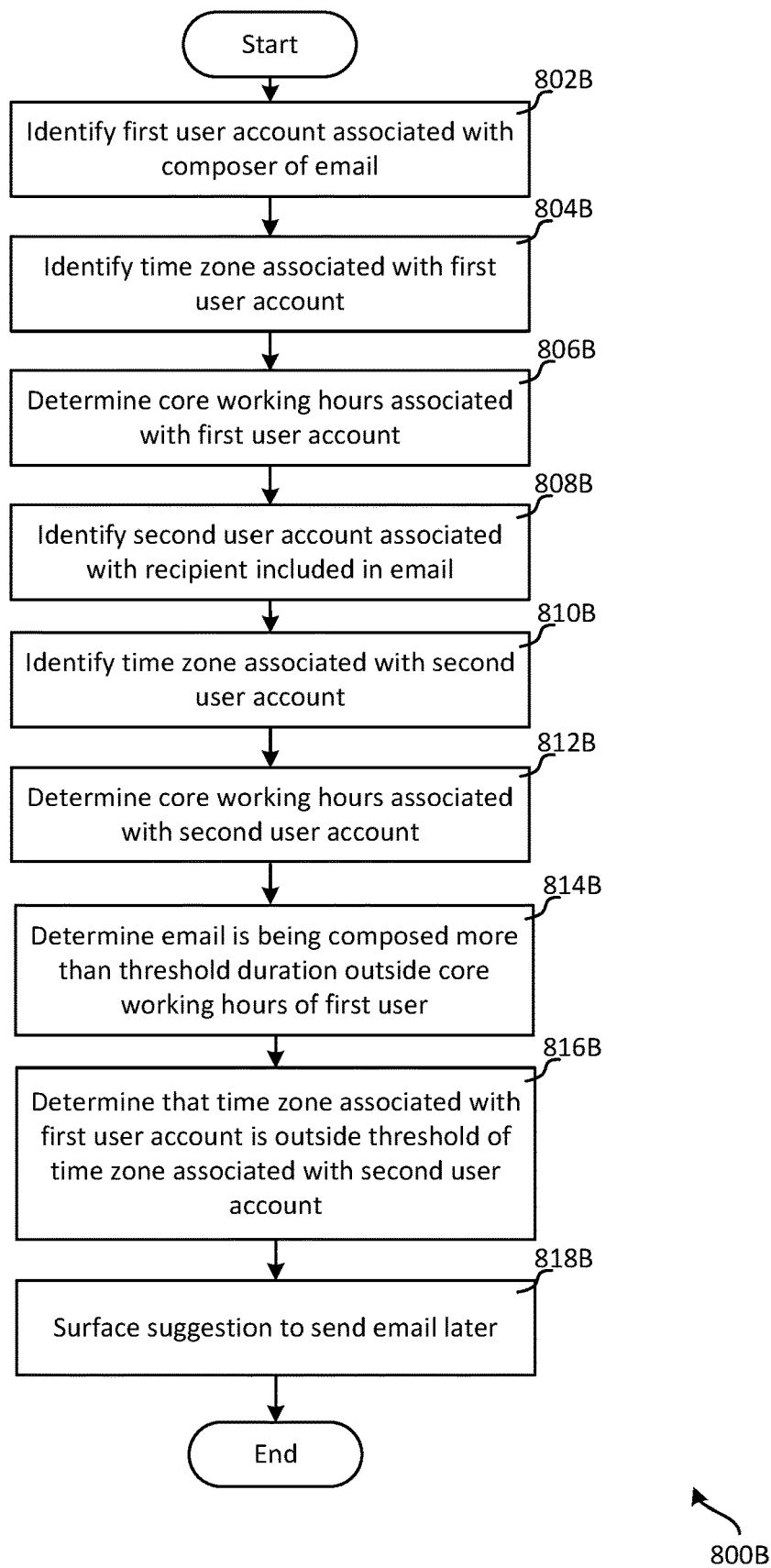
FIG. 8B is an exemplary method for surfacing suggestions for later delivery of email messages in relation to a drafter that is outside of a threshold number of time zones of recipients.

FIG. 8B is an exemplary method 800B for surfacing suggestions for later delivery of email messages in relation to a drafter that is outside of a threshold number of time zones of recipients. The method 800B begins at a start operation and flow moves to operation 802B.

At operation 802B a first user account is identified, the first user account being associated with a composer of an email. The user account may be associated with a computing device that the email is being drafted on and/or a cloud-based account that provides access to one or more cloud-based applications and/or services. In some examples, the user account may be associated with a delayed messaging service. The email may be drafted on an email application that installed locally on the composer's computing device or on an email application that is hosted in the cloud.

From operation 802B flow continues to operation 804B where a time zone associated with the first user account is identified. The time zone may be identified based on settings associated with the user account or a computing device associated with the user account; based on time, date, and/or clock settings associated with the user account or a computing device associated with the user account; and/or based on information obtained from one or more other computing devices associated with the user account (e.g., time/date information from a smart phone associated with the user account, time/date information from a tablet device associated with the user account, etc.).

From operation 804B flow continues to operation 806B where core working hours associated with the first user account are determined. The core working hours may be based on work settings associated with user account. For example, one or more computing devices associated with the user account may include core working hours for the associated user. In additional examples, the core working hours may be automatically determined based on one or more signals. In some examples, the core working hours may be determined based on location data associated with the user account (e.g., smart phone associated with user account travels to and/or from work at X and Y times). In additional examples, the core working hours may be determined based on analyzing timestamp and use data from one or more productivity applications associated with the user account (e.g., email applications, word processing applications, spreadsheet applications, productivity applications). In still additional examples, the core working hours may be determined based on analyzing calendar data associated with the user account. Any combination of the same may be utilized in determining the core working hours for a user/user account.

From operation 806B flow continues to operation 808B where a second user account is identified, the second user account being associated with a recipient included in the email. In examples, the second user account may be identified by the delayed messaging service associated with the first user and/or the second user. In some examples, a user must have to affirmatively opt in (e.g., via selection of privacy settings) for the delayed messaging service to have access to the user's account information (e.g., core working hours, time zone information, productivity application information, contacts information, etc.).

From operation 808B flow continues to operation 810B where a time zone associated with the second user account is identified. The time zone may be identified based on settings associated with the user account or a computing device associated with the user account; based on time, date, and/or clock settings associated with the user account or a computing device associated with the user account; and/or based on information obtained from one or more other computing devices associated with the user account (e.g., time/date information from a smart phone associated with the user account, time/date information from a tablet device associated with the user account, etc.).

From operation 810B flow continues to operation 812B where core working hours associated with the second user account are determined. The core working hours may be based on work settings associated with user account. For example, one or more computing devices associated with the user account may include core working hours for the associated user. In additional examples, the core working hours may be automatically determined based on one or more signals. In some examples, the core working hours may be determined based on location data associated with the user account (e.g., smart phone associated with user account travels to and/or from work at X and Y times). In additional examples, the core working hours may be determined based on analyzing timestamp and use data from one or more productivity applications associated with the user account (e.g., email applications, word processing applications, spreadsheet applications, productivity applications). In still additional examples, the core working hours may be determined based on analyzing calendar data associated with the user account. Any combination of the same may be utilized in determining the core working hours for a user/user account.

From operation 812B flow continues to operation 814B where a determination is made that the email is being composed more than a threshold duration of time outside of the core working hours associated with the first user account. For example, the email may be being drafted a threshold duration of time prior to the first user's core working hours beginning for a day or a threshold duration of time after the first user's core working hours have ended for a day. The threshold duration may be determined based on a time that the email is being drafted utilizing timestamp and editing information from the email application (e.g., a time when one or more characters have been typed in an email, a time when one or more recipients are added to an email, etc.), and/or based on a time that a "send" command is received for the email. The threshold duration of time may be one millisecond, five minutes, an hour, two hours, and/or three hours, for example.

From operation 814B flow continues to operation 816B where a determination is made that the time zone associated with the first user account is outside a threshold temporal period of the time zone associated with the second user account. In some examples, the threshold temporal period may be a single time zone, two time zones, three time zones, or four time zones, for example.

From operation 816B flow continues to operation 818B where a suggestion to send the email at a time corresponding to the core working hours associated with the second user account is surfaced (e.g., a suggestion to send the email when the second user account begins core working hours for the day).

From operation 818B flow moves to an end operation and the method 800B end.

Figure 8C:
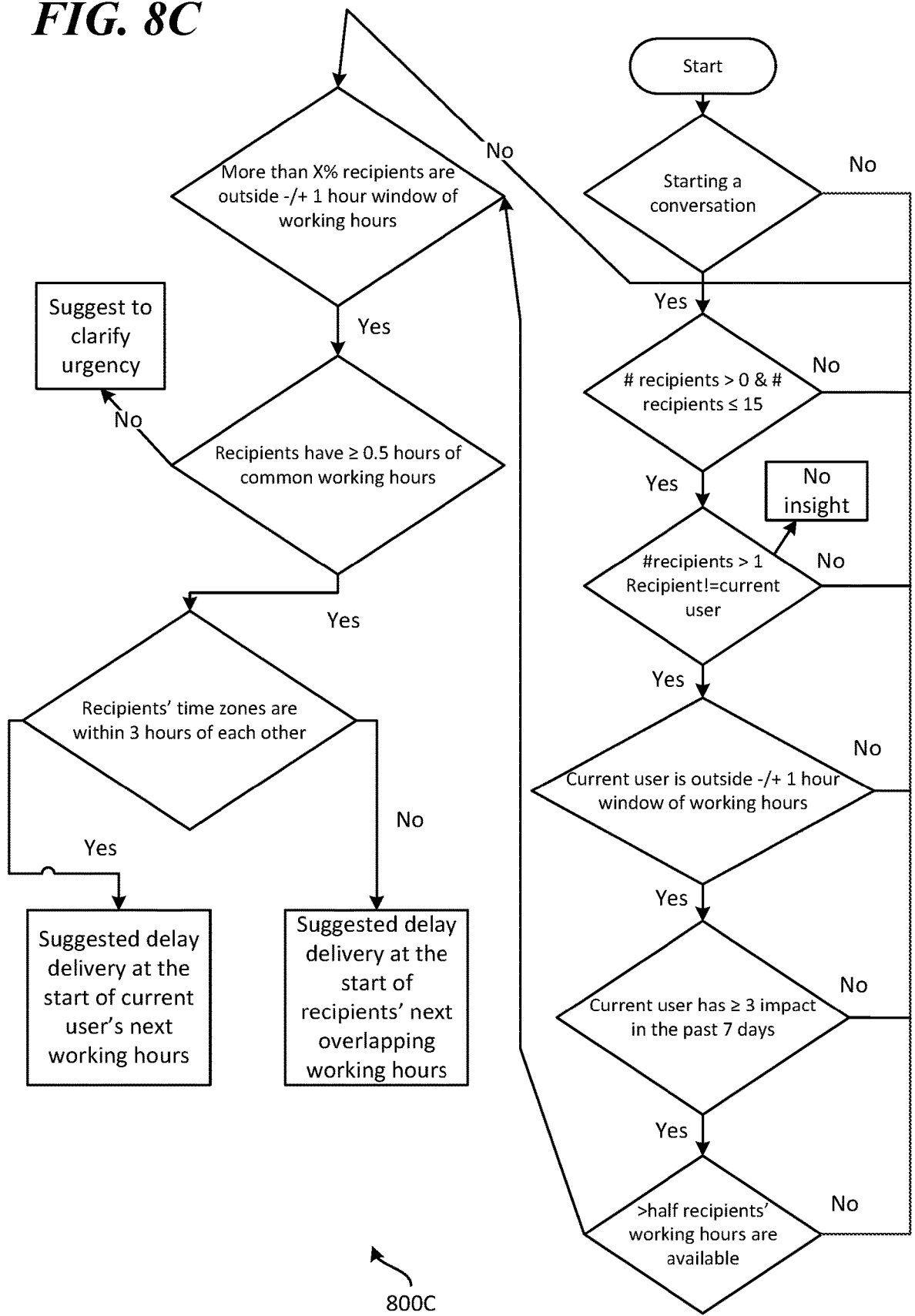
FIG. 8C is an exemplary method for surfacing suggestions for later delivery of email messages.

FIG. 8C is an exemplary method 800C for surfacing suggestions for later delivery of email messages. The numbers, percentages, hours, and times included in the operations included in FIG. 8C are for exemplary purposes only. Other numbers, percentages, hours and times may be utilized according to the description herein. For example, although FIG. 8C includes an operation that is determining whether "current user is outside −/+1 hours window of working hours" it should be understood that one hour is exemplary and the operation could be 0.5 hours, 1.5 hours, 2 hours, etc. Similarly, there is an operation that is to determine whether "recipients have ≥0.5 hours of common working hours". It should be understood that 0.5 hours is exemplary and the operation could be 0.25 hours, 0.75 hours, 1 hour, etc.

Figure 9:
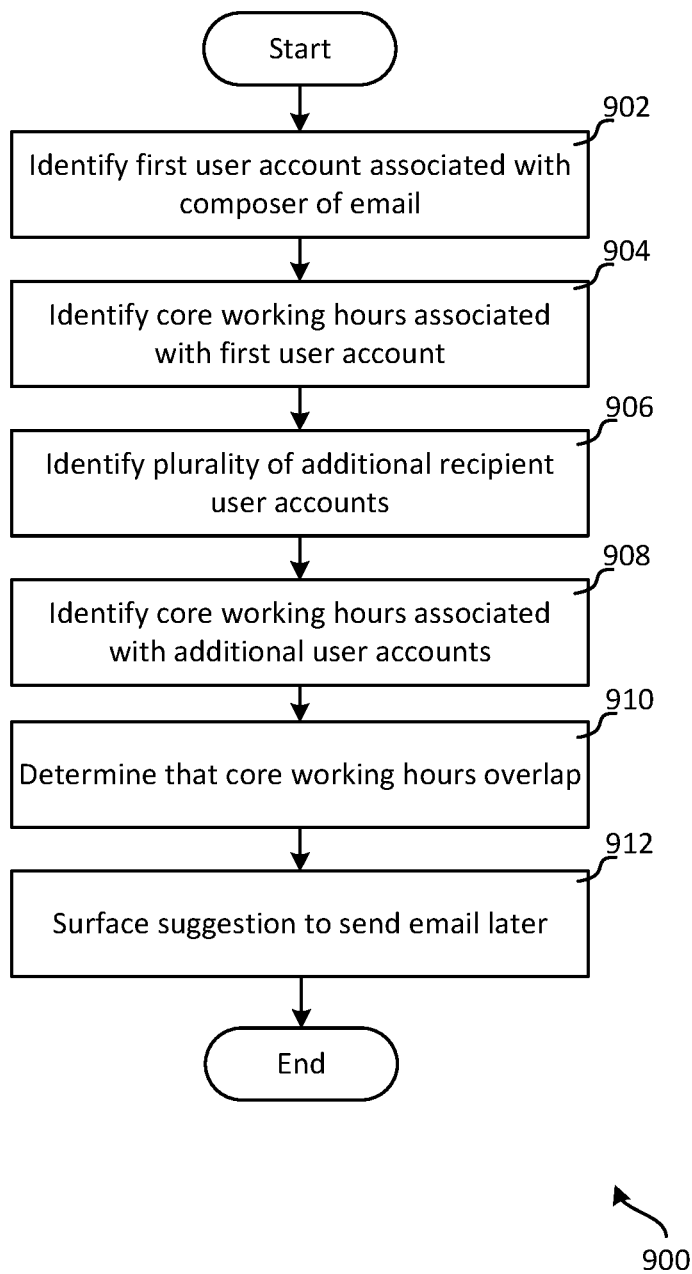
FIG. 9 is an exemplary method for surfacing suggestions for later delivery of email messages in relation to a drafter that is drafting an email to recipients during the recipients' quiet hours.

FIG. 9 is an exemplary method 900 for surfacing suggestions for later delivery of email messages in relation to a drafter that is drafting an email to recipients during the recipients' quiet hours. The method 900 begins at a start operation and flow moves to operation 902.

At operation 902 a first user account is identified, the first user account associated with a composer of an email. The user account may be associated with a computing device that the email is being drafted on and/or a cloud-based account that provides access to one or more cloud-based applications and/or services. In some examples, the user account may be associated with a delayed messaging service. The email may be drafted on an email application that installed locally on the composer's computing device or on an email application that is hosted in the cloud.

From operation 902 flow continues to operation 904 where a plurality of additional user accounts is identified, each of the plurality of additional user accounts being a recipient account included in the email. In examples, the recipient user accounts may be included in the "to" field of the email, the "cc" field of the email, and/or in the body of the email (e.g., "@[useraccount]"). The user accounts may be identified by the delayed messaging service. In some examples, a user must have to affirmatively opt in (e.g., via selection of a privacy setting) for the delayed messaging service to have access to the user's account information (e.g., core working hours, time zone information, productivity application information, contacts information, etc.).

From operation 904 flow continues to operation 906 where core working hours associated with each of the additional user accounts are identified. The core working hours may be identified/determined based on work settings associated with the additional user accounts. For example, one or more computing devices associated with the user accounts may include core working hours for the associated users. In additional examples, the core working hours may be automatically determined based on one or more signals. In some examples, the core working hours may be determined based on location data associated with the user accounts (e.g., smart phones associated with user accounts may indicate travel to and/or from work at X and Y times, IP addresses associated with devices accessing different locations). In additional examples, the core working hours may be determined based on analyzing timestamp and use data from one or more productivity applications associated with the user accounts (e.g., email applications, word processing applications, spreadsheet applications, productivity applications). In still additional examples, the core working hours may be determined based on analyzing calendar data associated with the user accounts. Any combination of the same may be utilized in determining the core working hours for a given user/user account.

From operation 906 flow continues to operation 908 where a determination is made that the core working hours for each of the additional user accounts overlap to within a threshold duration of time. That is, a determination is made that each of the additional user accounts (the recipient users) have core working hours that are shared amongst them. In some examples, the threshold duration of time may be half an hour, one hour, two hours, three hours, etc.

From operation 908 flow continues to operation 910 where a suggestion to send the email at a time corresponding to an overlap in the core working hours for each of the additional user accounts is surfaced. Thus, if each of the additional user accounts have core working hours that begin at 9:00 am local recipient time, the surfaced suggestion may recommend sending the email at 9:00 am local recipient time. Alternatively, if a first additional user account has core working hours from 9:00 am to 5:00 μm, and a second additional user account has core working hours from 10:00 am to 6:00 μm, the surfaced suggestion may recommend sending the email at 10:00 am because that is the first time that the additional user accounts' core working hours overlap.

From operation 910 flow moves to an end operation and the method 900 ends.

Figure 10:
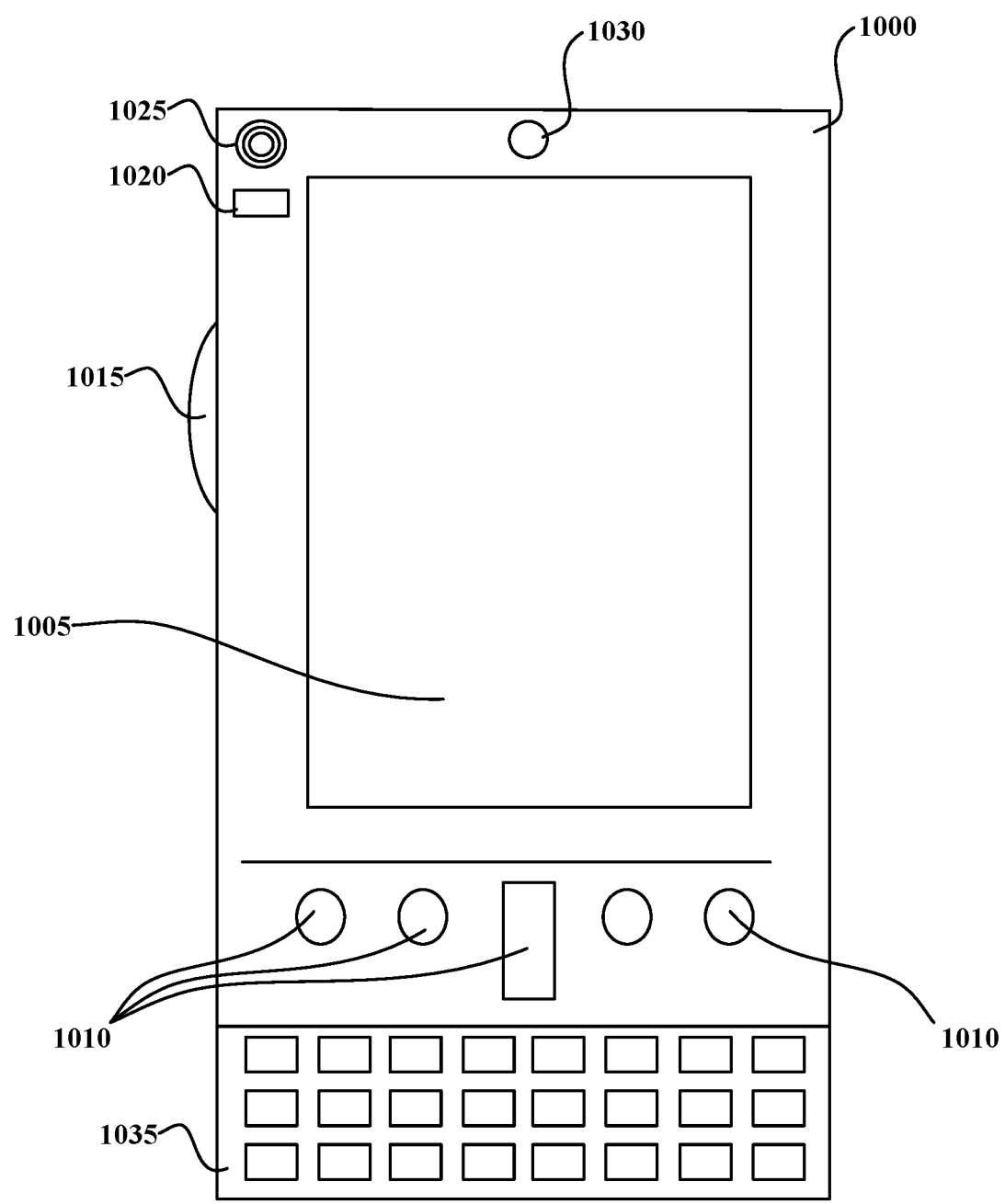
FIGS. 10 and 11 are simplified diagrams of a mobile computing device with which aspects of the disclosure may be practiced.
Figure 11:
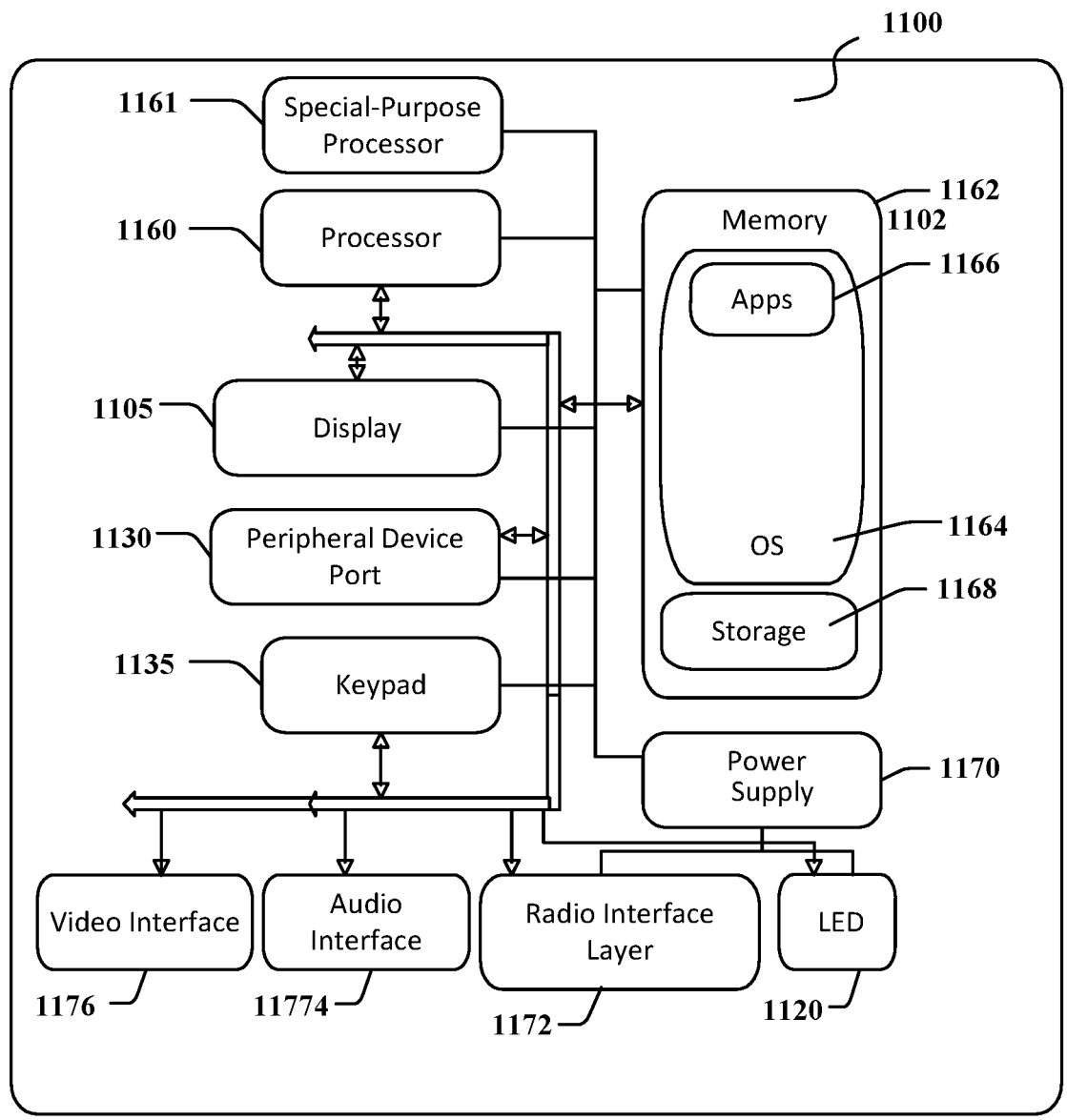

FIGS. 10 and 11 illustrate a mobile computing device 1000, for example, a mobile telephone, a smart phone, wearable computer (such as smart eyeglasses, a smartwatch, a fitness tracker), a tablet computer, an e-reader, a laptop computer, or other AR compatible computing device, with which embodiments of the disclosure may be practiced. With reference to FIG. 10, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or fewer input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035. Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 11 is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including instructions for providing and operating a digital assistant computing platform.

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 702 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1020 may be used to provide visual notifications, and/or an audio interface 1174 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1025, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of an on-board camera 1030 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11 by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
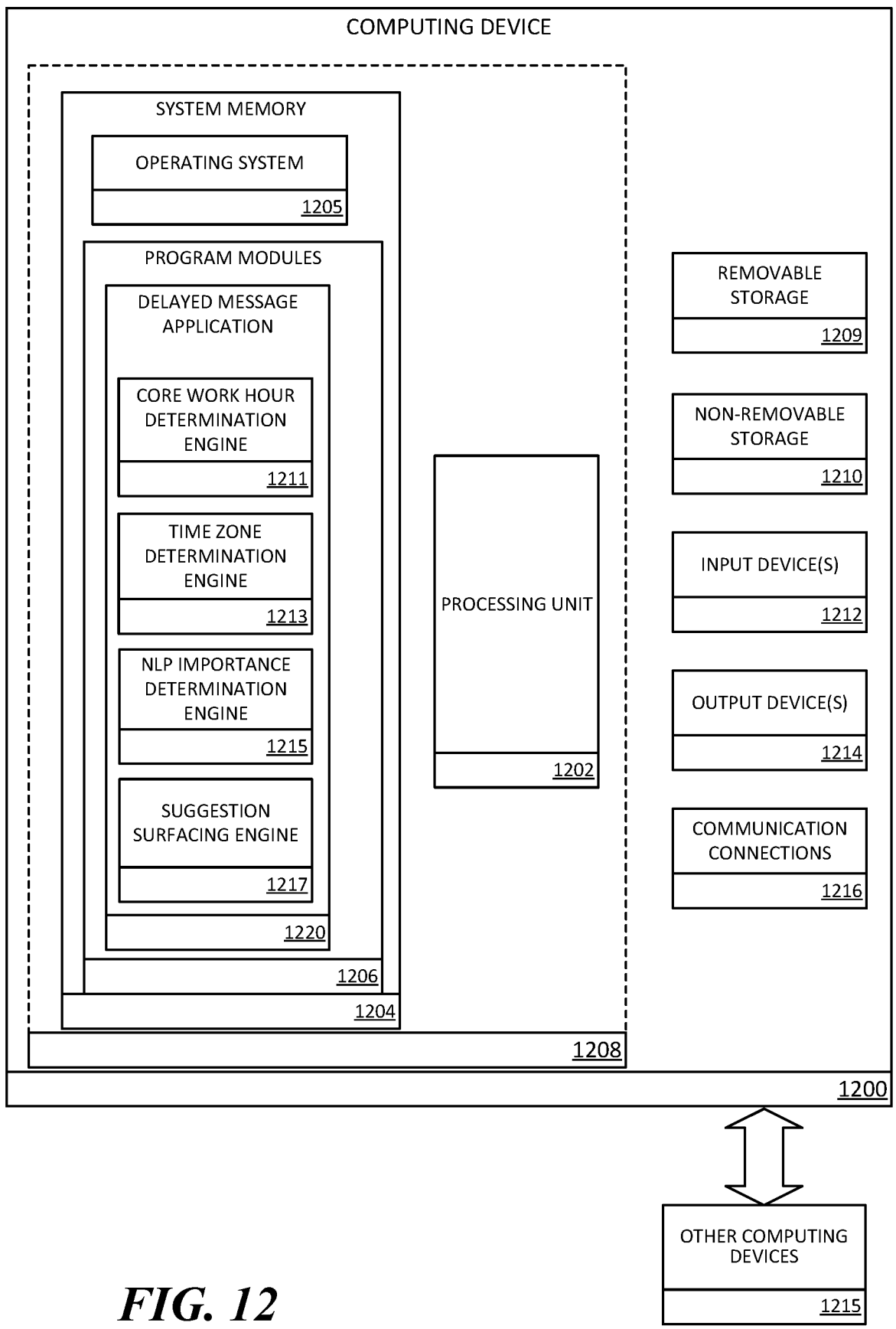
FIG. 12 is a block diagram illustrating example physical components of a computing device with which aspects of the disclosure may be practiced.

FIG. 12 is a block diagram illustrating physical components (e.g., hardware) of a computing device 1200 with which aspects of the disclosure may be practiced. The computing device components described below may have computer executable instructions for generating, surfacing and providing operations associated with delayed messaging suggestions. In a basic configuration, the computing device 1200 may include at least one processing unit 1202 and a system memory 1204. Depending on the configuration and type of computing device, the system memory 1204 may comprise, but is not limited to, volatile storage (e.g., random access memory), non-volatile storage (e.g., read-only memory), flash memory, or any combination of such memories. The system memory 1204 may include an operating system 1205 suitable for running one or more delayed messaging programs. The operating system 1205, for example, may be suitable for controlling the operation of the computing device 1200. Furthermore, embodiments of the disclosure may be practiced in conjunction with a graphics library, other operating systems, or any other application program and is not limited to any particular application or system. This basic configuration is illustrated in FIG. 12 by those components within a dashed line 1208. The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by a removable storage device 1209 and a non-removable storage device 1210.

As stated above, a number of program modules and data files may be stored in the system memory 1204. While executing on the processing unit 1202, the program modules 1206 (e.g., delayed message application 1220) may perform processes including, but not limited to, the aspects, as described herein. According to examples, core work hour determination engine 1211 may perform one or more operations associated with analyzing user settings and/or contextual information associated with productivity applications to identify core working hours of users. Time zone determination engine 1213 may perform one or more operations associated with analyzing user settings, device settings, and/or location information to identify time zones of users. Natural language processing importance determination engine 1215 may perform one or more operations associated with applying one or more natural language processing models to language in emails to determine an importance associated with those emails and modifying potential delay suggestions based on those determinations. Suggestion surfacing engine 1217 may perform one or more operations associated with causing email delay suggestions and insights to be surfaced in association with emails that are drafted after core working hours for one or more recipients.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1200 may also have one or more input device(s) 1212 such as a keyboard, a mouse, a pen, a sound or voice input device, a touch or swipe input device, etc. The output device(s) 1214 such as a display, speakers, a printer, etc. may also be included. The aforementioned devices are examples and others may be used. The computing device 1200 may include one or more communication connections 1216 allowing communications with other computing devices 1250. Examples of suitable communication connections 1216 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1204, the removable storage device 1209, and the non-removable storage device 1210 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 13:
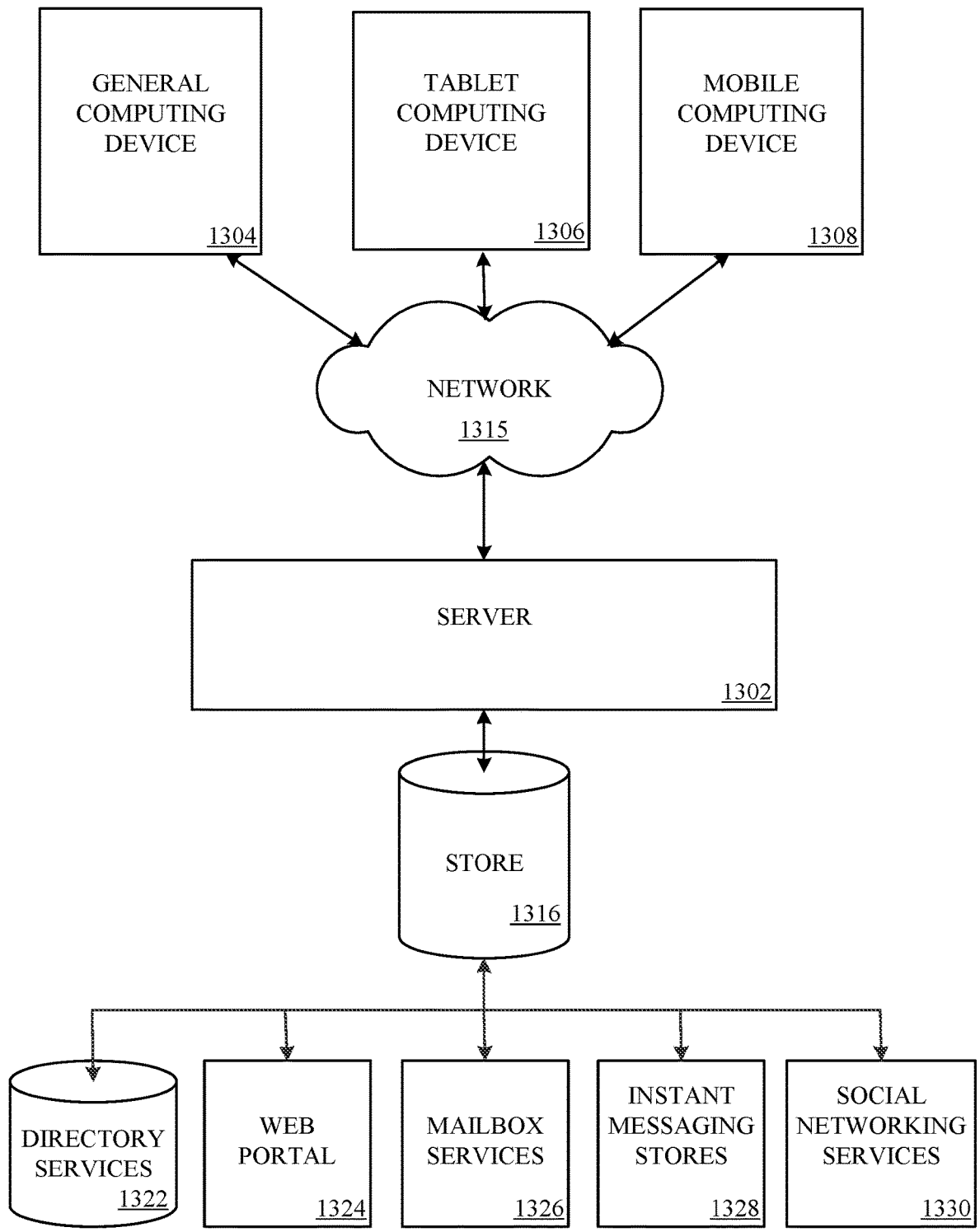
FIG. 13 is a simplified block diagram of a distributed computing system in which aspects of the present disclosure may be practiced.

FIG. 13 illustrates one aspect of the architecture of a system for processing data received at a computing system from a remote source, such as a personal/general computer 1304, tablet computing device 1306, or mobile computing device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking site 1330. The program modules 1206 may be employed by a client that communicates with server device 1302, and/or the program modules 1206 may be employed by server device 1302. The server device 1302 may provide data to and from a client computing device such as a personal/general computer 1304, a tablet computing device 1306 and/or a mobile computing device 1308 (e.g., a smart phone) through a network 1315. By way of example, the computer systems described herein may be embodied in a personal/general computer 1304, a tablet computing device 1306 and/or a mobile computing device 1308 (e.g., a smart phone). Any of these embodiments of the computing devices may obtain content from the store 1316, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for surfacing email suggestions, the method comprising:
    identifying a first user account, the first user account associated with a composer of an email;
    identifying a time zone associated with the first user account;
    determining core working hours associated with the first user account;
    identifying a second user account, the second user account being associated with a recipient included in the email;
    identifying a time zone associated with the second user account;
    determining core working hours associated with the second user account;
    making a first determination that the email is being composed more than a threshold duration of time outside of the core working hours associated with the first user account;
    making a second determination that the time zone associated with the first user account is within a threshold temporal period of the time zone associated with the second user account; and
    in response to the first determination and the second determination, surfacing a suggestion to send the email at a time when the core working hours associated with the first and second user accounts overlap.

2. The computer-implemented method of claim 1, further comprising:
    determining that there is a plurality of recipient user accounts associated with the email;
    identifying time zones associated with each of the plurality of recipient user accounts; and
    determining core working hours associated with each of the plurality of recipient user accounts.

3. The computer-implemented method of claim 2, wherein the suggestion is only surfaced upon:
    determining that the core working hours associated with the second user account and the core working hours associated with each of the plurality of recipient user accounts overlap for a first threshold duration of time; and
    determining that the time zone associated with the first user account is within the threshold temporal period of each of the time zones associated with each of the plurality of recipient user accounts.

4. The computer-implemented method of claim 1, wherein the time surfaced in the suggestion corresponds to a start time in a next business day of the core working hours associated with the first user account.

5. The computer-implemented method of claim 1, wherein the email is the start of a new email thread.

6. The computer-implemented method of claim 1, wherein determining core working hours associated with the first and second user accounts comprises:
    analyzing productivity application use data and associated timestamp information associated with the first and second user accounts.

7. The computer-implemented method of claim 3, wherein the first threshold duration of time is 0.5 hours.

8. The computer-implemented method of claim 1, wherein the threshold duration of time is one hour.

9. The computer-implemented method of claim 1, wherein the threshold temporal period is three time zones.

10. The computer-implemented method of claim 1, wherein the suggestion is surfaced in the email while the email is being composed.

11. The computer-implemented method of claim 1, wherein the suggestion is selectable for automatically delaying the sending of the email until the time when the core working hours associated with the first and second user accounts overlap.

12. The computer-implemented method of claim 1, wherein the time zones associated with the first user account and the second user account are identified based on electronic clock information associated with computing devices associated with the first user account and the second user account.

13. A system for surfacing email suggestions, comprising:
    a memory for storing executable program code; and
    one or more processors, functionally coupled to the memory, the one or more processors being responsive to computer-executable instructions contained in the program code and operative to:
        identify a first user account, the first user account associated with a composer of an email;
        identify a time zone associated with the first user account;
        determine core working hours associated with the first user account;
        identify a second user account, the second user account being associated with a recipient included in the email;
        identify a time zone associated with the second user account;
        determine core working hours associated with the second user account;
        make a first determination that the email is being composed more than a threshold duration of time outside of the core working hours associated with the first user account;
        make a second determination that the time zone associated with the first user account is outside a threshold temporal period of the time zone associated with the second user account; and
        in response to the first determination and the second determination, surface a suggestion to send the email at a time corresponding to the core working hours associated with the second user account.

14. The system of claim 13, wherein the one or more processors are further responsive to the computer-executable instructions contained in the program code and operative to:
    determine that there is a plurality of recipient user accounts associated with the email;
    identify time zones associated with each of the plurality of recipient user accounts; and
    determine core working hours associated with each of the plurality of recipient user accounts.

15. The system of claim 14, wherein the one or more processors are further responsive to the computer-executable instructions contained in the program code and operative to:
    only surface the suggestion in response to:

determining that the core working hours associated each of the plurality of recipient user accounts overlap for a first threshold duration of time; and determining that the time zone associated with the first user account is outside the threshold temporal period of each of the time zones associated with each of the plurality of recipient user accounts.

16. The system of claim 13, wherein the email is the start of a new email thread.

17. The system of claim 14, wherein the time surfaced in the suggestion corresponds to a first time in a next business day that the core working hours for each of the plurality of recipient user accounts overlap.

18. A computer-readable storage device comprising executable instructions that, when executed by one or more processors, assist with surfacing email suggestions, the computer-readable storage device including instructions executable by the one or more processors for:

identifying a first user account, the first user account associated with a composer of an email;

identifying core working hours associated with the first user account;

identifying a plurality of additional user accounts, each of the plurality of additional user accounts being a recipient account included in the email;

identifying core working hours associated with each of the additional user accounts;

making a first determination that the core working hours for each of the additional user accounts overlap to within a threshold duration of time;

making a second determination that the time zone associated with the first user account is within a threshold temporal period of the time zone associated with a threshold number of the additional user accounts; and in response to the first determination and the second determination, surfacing a suggestion to send the email at a time corresponding to an overlap in the core working hours for each of the additional user accounts.

19. The computer-readable storage device of claim 18, wherein the time surfaced in the suggestion corresponds to a first time in a next business day that the core working hours for each of the plurality of additional user accounts overlap.

20. The computer-readable storage device of claim 18, wherein in identifying core working hours associated with the first user account, the instructions are further executable by the one or more processors for:

analyzing productivity application use data and associated timestamp information for the first user account.

* * * * *